(12) United States Patent
Venugopal et al.

(10) Patent No.: US 11,546,630 B2
(45) Date of Patent: Jan. 3, 2023

(54) VIDEO CODEC USING TEMPLATE MATCHING PREDICTION

(71) Applicant: Fraunhofer-Gesellschaft zur Förderung der angewandten Forschung e.V., Munich (DE)

(72) Inventors: Gayathri Venugopal, Berlin (DE); Detlev Marpe, Berlin (DE); Thomas Wiegand, Berlin (DE)

(73) Assignee: FRAUNHOFER-GESELLSCHAFT ZUR F RDERUNG DER ANGEWANDTEN FORSCHUNG E.V.

( * ) Notice: Subject to any disclaimer, the term of this patent is extended or adjusted under 35 U.S.C. 154(b) by 54 days.

(21) Appl. No.: 17/107,043

(22) Filed: Nov. 30, 2020

(65) Prior Publication Data

US 2021/0084329 A1   Mar. 18, 2021

Related U.S. Application Data

(63) Continuation of application No. PCT/EP2018/084030, filed on Dec. 7, 2018.

(30) Foreign Application Priority Data

Jun. 1, 2018   (EP) ..................................... 18175540

(51) Int. Cl.
*H04N 19/46*   (2014.01)
*H04N 19/52*   (2014.01)
(Continued)

(52) U.S. Cl.
CPC ........... *H04N 19/57* (2014.11); *H04N 19/105* (2014.11); *H04N 19/119* (2014.11);
(Continued)

(58) Field of Classification Search
CPC .. H04N 19/105; H04N 19/119; H04N 19/134; H04N 19/172; H04N 19/176;
(Continued)

(56) References Cited

U.S. PATENT DOCUMENTS

2010/0246675 A1\* 9/2010 Gharavi-Alkhansari ................... H04N 19/134
375/240.13
2012/0057631 A1\* 3/2012 Le Leannec ........... H04N 19/33
375/240.16
(Continued)

FOREIGN PATENT DOCUMENTS

| EP | 2334080 A1 | 6/2011 |
| WO | 2011/090783 A1 | 7/2011 |
| WO | 2016/160608 A1 | 10/2016 |

OTHER PUBLICATIONS

V. Sze et al.. High Efficiency Video Coding (HEVC) Algorithms and Architectures. Springer, 2014.
(Continued)

*Primary Examiner* — Anner N Holder
(74) *Attorney, Agent, or Firm* — Novick, Kim & Lee PLLC; Jae Youn Kim

(57) ABSTRACT

Video decoder and/or video encoder, configured to determine a set of search area location candidates in a reference picture of a video; match the set of search area location candidates with a current template area adjacent to a current block of a current picture to obtain a best matching search area location candidate; select, out of a search area positioned in the reference picture at the best matching search area location candidate, a set of one or more predictor blocks by matching the current template area against the search area; and predictively decode/encode the current block from/into a data stream based on the set of one or more predictor blocks.

36 Claims, 16 Drawing Sheets

(51) Int. Cl.

| | | |
|---|---|---|
| *H04N 19/56* | (2014.01) | |
| *H04N 19/57* | (2014.01) | |
| *H04N 19/105* | (2014.01) | |
| *H04N 19/119* | (2014.01) | |
| *H04N 19/169* | (2014.01) | |
| *H04N 19/172* | (2014.01) | |
| *H04N 19/176* | (2014.01) | |

(52) U.S. Cl.
CPC ......... *H04N 19/172* (2014.11); *H04N 19/176* (2014.11); *H04N 19/1887* (2014.11); *H04N 19/46* (2014.11); *H04N 19/52* (2014.11); *H04N 19/56* (2014.11)

(58) Field of Classification Search
CPC .... H04N 19/1887; H04N 19/46; H04N 19/51; H04N 19/52; H04N 19/533; H04N 19/56; H04N 19/57
See application file for complete search history.

(56) References Cited

U.S. PATENT DOCUMENTS

| | | | | |
|---|---|---|---|---|
| 2013/0287116 | A1* | 10/2013 | Helle | H04N 19/52 375/240.24 |
| 2015/0365696 | A1* | 12/2015 | Garud | H04N 19/53 375/240.08 |
| 2017/0142438 | A1* | 5/2017 | Hepper | H04N 19/122 |
| 2018/0098070 | A1* | 4/2018 | Chuang | H04N 19/137 |
| 2019/0082192 | A1* | 3/2019 | Chuang | H04N 19/176 |

OTHER PUBLICATIONS

T. Wiegand et al., "Overview of the H.264/AVC video coding standard," in IEEE Transactions on Circuits and Systems for Video Technology, vol. 13, Jul. 2003.
G. J. Sullivan et al., "Overview of the high efficiency video coding HEVC standard," in IEEE Transactions on Circuits and Systems for Video Technology, vol. 22, Dec. 2012, pp. 1649-1668.
K. Sugimoto et al., "Inter frame coding with template matching spatio-temporal prediction," in IEEE International Conference on Image Processing (ICIP), Singapore, Singapore, Oct. 2004.
Yoshinori Suzuki et al., "Inter Frame Coding with Template Matching Averaging". ICIP 2007. IEEE International Conference on Image Processing, IEEE, PI, pp. III-409, XP031158091.
R. Wang et al., "Combining template matching and block motion compensation for video coding," in International Symposium on Intelligent Signal Processing and Communication Systems (ISPACS 2010).
S. Kamp et al., "Decoder side motion vector derivation for inter frame video coding," in IEEE International Conference on Image Processing (ICIP), San Diego, CA, USA, Oct. 2008.
S. Kamp et al., "Decoder-side motion vector derivation for hybrid video inter coding," in IEEE International Conference on Multimedia and Expo (ICME), Suntec City, Singapore, Jul. 2010.
S. Kamp et al., "Decoder-Side Motion Vector Derivation for Block-Based Video Coding", IEEE Transactions on Circuits and Systems for Video Technology, Institute of Electrical and Electronics Engineers, US, (Dec. 1, 2012), vol. 22, No. 12, pp. 1732-1745, XP011487149.
S. Kamp et al., "Fast decoder side motion vector derivation for inter frame video coding," in Picture Coding Symposium (PCS), Chicago, IL, USA, May 2009.
Chen J et al., "JVET-G1001—Algorithm description of Joint Exploration Test Model 7 (JEM7)", (Aug. 19, 2017), pp. i-iv, 1, Joint Video Exploration Team (JVET)of ITU-T SG 16 WP 3 and ISO/IEC JTC 1/SC 29/WG 11, 7th Meeting, Jul. 13, 2017-Jul. 21, 2017; Torino, URL: http://phenix.int-evry.fr/jvet/doc_end_user/documents/7_Torino/wg11/JVET-G0001-v1.zip, XP030150980.
S. Esenlik et al., "CE9: Summary report on decoder side mv derivation," in JVET-K0029, Ljubljana, SI, Jul. 2018.
L.-Y. Wei et al., "Fast texture synthesis using tree-structured vector quantization," vol. 34, May 2000.
Venugopal Gayathri et al., "Fast template matching for intra prediction", 2017 IEEE International Conference on Image Processing (ICIP), IEEE, (Sep. 17, 2017), pp. 1692-1696, XP033322863.
T. K. Tan et al., "Intra prediction by averaged template matching predictors," in Proc. CCNC 2007, Las Vegas, NV, USA, 2007, pp. 405-409.
D. Marpe et al., "Context-based adaptive binary arithmetic coding in the H.264/AVC video compression standard," in IEEE Transactions on Circuits and Systems for Video Technology, vol. 13, Jul. 2003, pp. 620-636.
B. Bross, "Versatile video coding (draft 1)," in JVET-J1001, San Diego, US, Apr. 2018.
J. Chen et al., "Algorithm description for versatile video coding and test model 1 (VTM 1)," in JVET-J1002, San Diego, US, Apr. 2018.
F. Bossen et al., "JVET common test conditions and software reference configurations," in JVET-K1010, Ljubljana, SI, Jul. 2018.
H. Yu et al., "Common test conditions for screen content coding," in JCTVC-U1015, Warsaw, PL, Jun. 2015.
M. Albrecht et al., "Description of SDR, HDR, and 360 video coding technology proposal by Fraunhofer HHI," in JVET-J0014-v1, San Diego, US, Apr. 2018.
A. Segall et al., "Joint call for proposals on video compression with capability beyond HEVC," in JVET-H1002 (v6), Macau, China, Oct. 2017.
Venugopal G et al., "Intra Region-based Template Matching", 10. JVET Meeting; Apr. 10, 2018-Apr. 20, 2018; San Diego; (The Joint Video Exploration Team of ISO/IEC JTC1/SC29/WG11 and ITU-T SG.16 ); URL: http://phenix.int-evry.fr/jvet/,, (Apr. 3, 2018), No. JVET-J0039, XP030151212.
Ce Zhu et al., "Hexagon-Based Search Pattern for Fast Block Motion Estimation", IEEE Transactions on Circuits and Systems for Video Technology, Institute of Electrical and Electronics Engineers, US, (May 1, 2002), vol. 12, No. 5, ISSN 1051-8215, XP011071829.
Binh P Nguyen et al., "Prediction-based directional search for fast block-matching motion estimation", Proceedings of the 2010 Symposium on Information and Communication Technology, ACM, 2 Penn Plaza, Suite 701 New York NY 10121-0701 USA, (Aug. 27, 2010), doi:10.1145/1852611.1852629, ISBN 978-1-4503-0105-3, pp. 86-91, XP058359852.

* cited by examiner

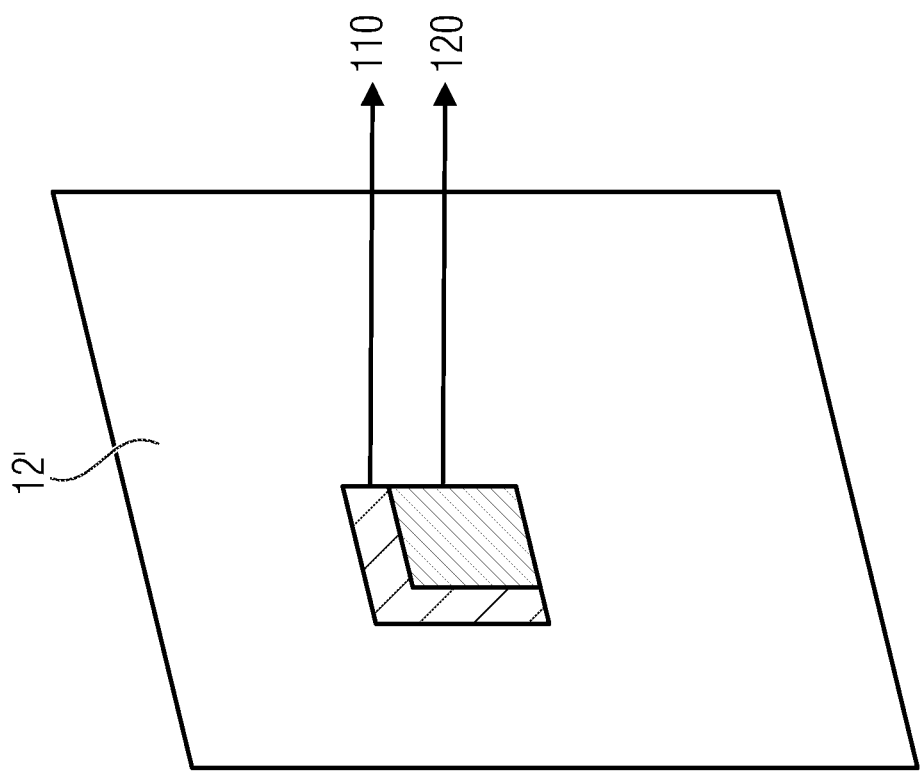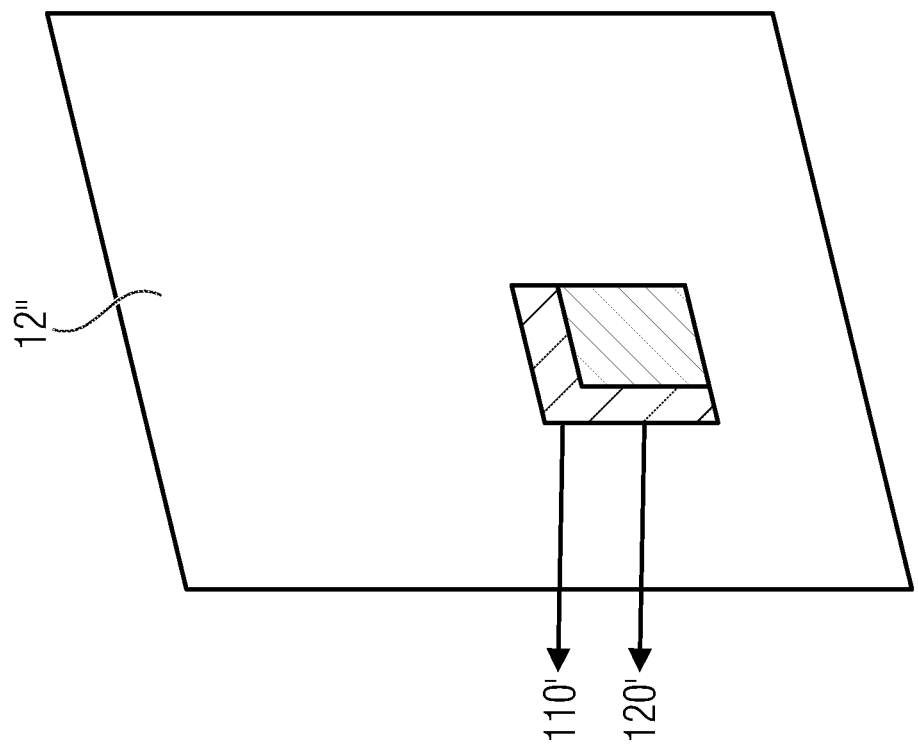
Fig. 4

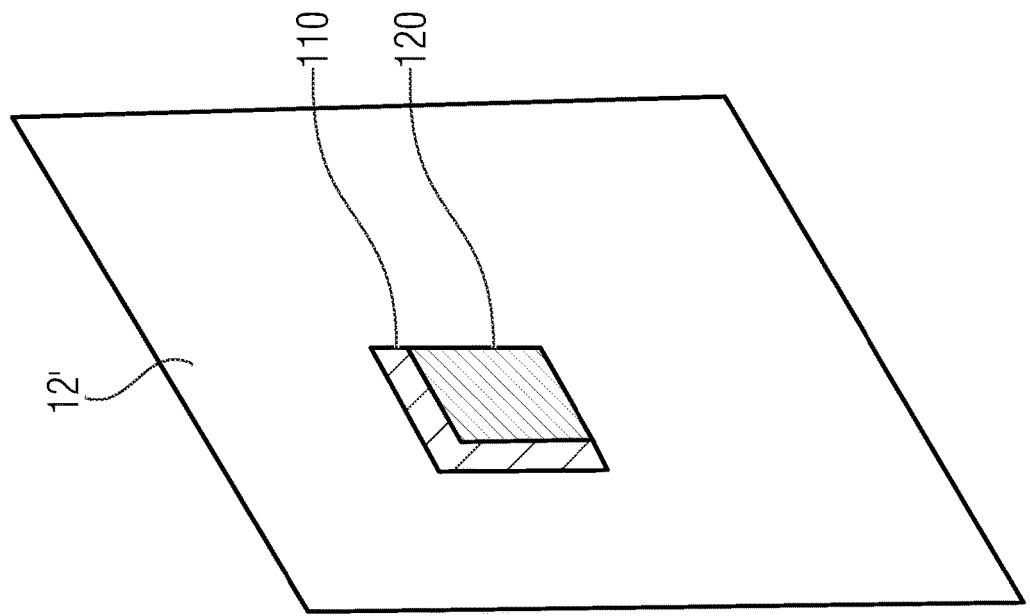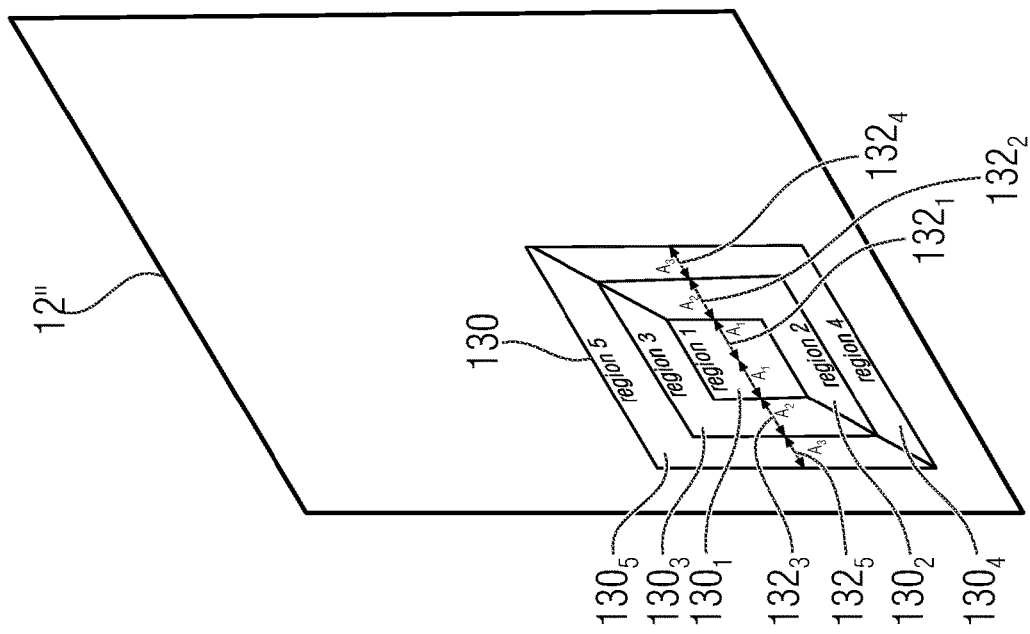
Fig. 7

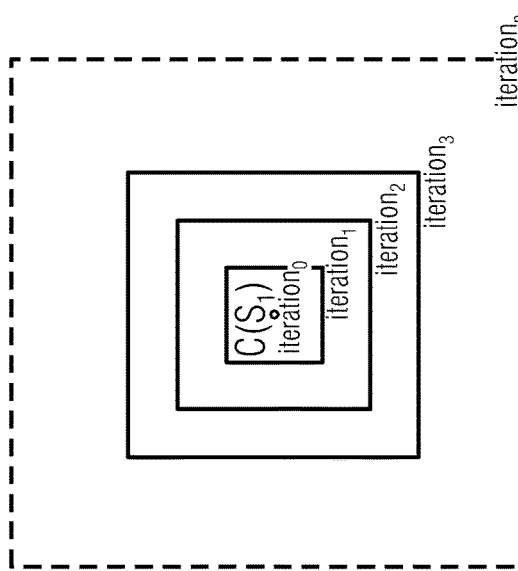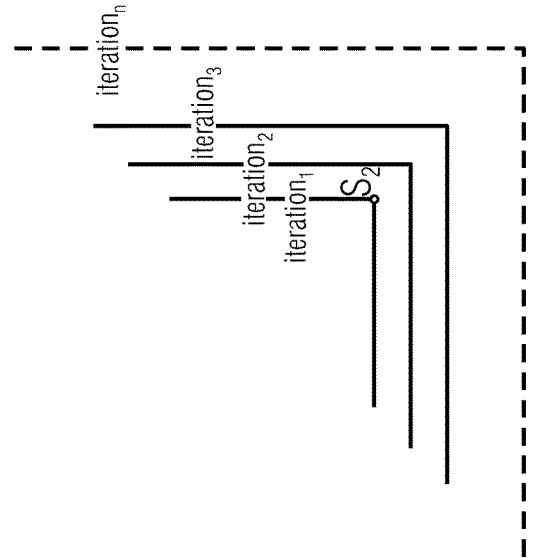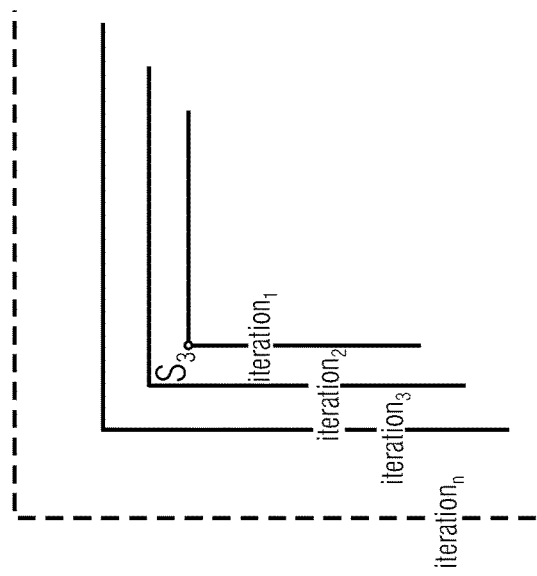
Fig. 9a
Fig. 9b
Fig. 9c number of predictors and the corresponding weights for the prediction signal

| no. of predictors, I | weight of the sorted predictors, $w_{il}$ | | | | | | | |
|---|---|---|---|---|---|---|---|---|
| | $w_{1l}$ | $w_{2l}$ | $w_{3l}$ | $w_{4l}$ | $w_{5l}$ | $w_{6l}$ | $w_{7l}$ | $w_{8l}$ |
| 1 | 1 | 0 | 0 | 0 | 0 | 0 | 0 | 0 |
| 2 | 1 | 1 | 0 | 0 | 0 | 0 | 0 | 0 |
| 3 | 2 | 1 | 1 | 0 | 0 | 0 | 0 | 0 |
| 4 | 1 | 1 | 1 | 1 | 0 | 0 | 0 | 0 |
| 5 | 2 | 2 | 1 | 1 | 1 | 1 | 0 | 0 |
| 6 | 2 | 2 | 1 | 1 | 1 | 1 | 0 | 0 |
| 7 | 1 | 1 | 1 | 1 | 1 | 1 | 1 | 1 |
| 8 | 1 | 1 | 1 | 1 | 1 | 1 | 1 | 1 |

Fig. 12

| Block Size | Transform |
|---|---|
| 4 ≤ width ≤ 8 and ≤ height ≤ 8 | DST-VII |
| otherwise | DCT-II |

Fig. 13a

| Block Size (W x H) | Transform |
|---|---|
| $2^{min} \leq W \leq 2^{min+1}$ and $2^{min} \leq H \leq 2^{min+1}$ | DST-VII |
| otherwise | DCT-II |

Fig. 13b

| Test Sequences | | BD Rate (Y) |
|---|---|---|
| Class A1 | Tango | -6.90% |
| | Drums100 | -4.28% |
| | CampfireParty | -3.50% |
| | ToddlerFountain | -3.12% |
| Class A2 | CatRobot | -3.71% |
| | TrafficFlow | -0.75% |
| | DaylightRoad | -6.34% |
| | Rollercoaster (offset) | -8.26% |
| Class B | Kimono | -2.35% |
| | ParkScene | -1.13% |
| | Cactus | -1.94% |
| | BasketBallDrive | -4.67% |
| | BQTerrace | -3.11% |
| Class C | BasketBallDrill | -2.83% |
| | BQMall | -2.15% |
| | PartyScene | -1.25% |
| | RaceHorsesC | -3.91% |
| Class D | BasketBallPass | -2.81% |
| | BQSquare | -0.29% |
| | BlowingBubbles | -0.65% |
| | RaceHorses | -2.93% |
| Class F | BasketballDrillText | -2.46% |
| | ChinaSpeed | -4.07% |
| | SlideEditing | -0.27% |
| | SlideShow | -1.34% |
| Average | | -3.00% |
| Average excluding Class F | | -3.18% |
| Encoder run-time | | 184% |
| Decoder run-time | | 131% |

Fig. 15a

| Test Sequences | | BD Rate (Y) |
|---|---|---|
| Class A1 | Tango2 | -7.22% |
| | FoodMarket4 | -4.81% |
| | Campfire | -3.07% |
| Class A2 | CatRobot1 | -3.57% |
| | DaylightRoad2 | -6.29% |
| | ParkRunning3 | -2.69% |
| Class B | MarketPlace | -3.62% |
| | RitualDance | -4.12% |
| | Cactus | -1.80% |
| | BasketBallDrive | -4.44% |
| | BQTerrace | -3.00% |
| Class C | BasketBallDrill | -2.63% |
| | BQMall | -1.90% |
| | PartyScene | -1.13% |
| | RaceHorsesC | -3.49% |
| Class D | BasketBallPass | -2.33% |
| | BQSquare | -0.19% |
| | BlowingBubbles | -0.52% |
| | RaceHorses | -2.31% |
| Class F | BasketballDrillText | -2.26% |
| | ArenaOfValor | -1.31% |
| | SlideEditing | -0.22% |
| | SlideShow | -1.44% |
| Class TGM | FlyingGraphics | -5.19% |
| | Desktop | -4.58% |
| | Console | -9.57% |
| | ChineseEditing | -1.25% |
| Average | | -3.15% |
| Average excl. Class F, TGM | | -3.11% |
| Encoder run-time | | 132% |
| Decoder run-time | | 201% |

Fig. 15b

VIDEO CODEC USING TEMPLATE MATCHING PREDICTION

CROSS-REFERENCES TO RELATED APPLICATIONS

This application is a continuation of copending International Application No. PCT/EP2018/084030, filed Dec. 7, 2018, which is incorporated herein by reference in its entirety, and additionally claims priority from European Application No. EP 18 175 540.6, filed Jun. 1, 2018, which is incorporated herein by reference in its entirety.

Embodiments according to the invention relate to a video codec using template matching prediction.

BACKGROUND OF THE INVENTION

Modern video coding standards like H.265/High Efficiency Video Coding (HEVC) use a block-based hybrid structure for video compression. In such an approach, a picture is partitioned into blocks of samples and each block can be either intra or inter predicted. While intra-picture prediction exploits the spatial redundancy between neighboring blocks inside a picture, inter-picture prediction utilizes the large amount of temporal redundancy between pictures [1]. The latter case uses motion compensated prediction (MCP), which assumes that for each block, a similar block can be found from a previously decoded picture [2], [3]. Reference picture is the general term used for the already decoded picture and the displacement of the similar block with respect to the current block is called the motion vector (MV). The encoder executes a search algorithm for finding the displaced block in the reference picture and the MV components in horizontal and vertical directions are calculated. Since transmitting the complete motion vector may use a large amount of bits, predictive coding of the motion vector is typically used in the recent standards [2], [3]. This technique exploits the correlation between the motion vector of the current block and those of the neighboring blocks.

Decoder-side motion vector derivation (DMVD) methods have gained interest among the researchers in recent years. In such an algorithm, the motion information is not sent to the decoder, but it is derived there using different techniques. Template matching is a commonly investigated method for DMVD [4]-[10]. Furthermore, one of the tools, named as pattern matched motion vector derivation (PMVD), studied by the Joint Video Exploration Team (JVET) for the future standard is a template matching based DMVD method [11]. Similar DMVD approaches were proposed for Versatile Video Coding (VVC) [12]. The drawback of such template matching methods for DMVD is the increase in decoder run-time due to the related search algorithm. The herein described invention is intended to address this issue.

Template matching (TM) is a texture synthesis technique used in digital image processing where an unknown part of an image is synthesized using the information available from the neighboring known area [13]. Template is the general term used for the known part of the image. Many research papers on template matching for inter prediction can be found in the literature, like [4]-[10]. Typically, the known samples present above and left of the current block are considered as the template. A match for this template is found from the reference frame using an error minimizing metric. The block associated with the matched template is the prediction samples for the current block. In order to limit the computational complexity from the search algorithm for the template match, a search window is used in conventional template matching methods.

The region-based template matching (RTM) was proposed for intra frame coding in [14]. The aforementioned research paper reported substantial decrease in the decoder run-time compared to a intra prediction method using conventional template matching. The uniqueness of RTM is the concept of search window partitioning. Conventional template matching restricts its search for the best template match within a window. The RTM method goes one step further by partitioning the search window into multiple regions. The borders of these regions are clearly defined and hence they can generate an independent prediction signal. The intra RTM finds three predictor blocks from each region and the final prediction is the average of the predictor samples. The encoder calculates the rate-distortion (RD) cost for each of the five regions and compares it with that of other intra modes. If the chosen mode is RTM, an index to identify the region is transmitted to the decoder. The decoder repeats the search algorithm only in the signaled region. Since the RTM method was reported to offer a good trade-off between coding efficiency and run-time for intra coding [14], the idea is extended to be applicable to inter frame coding in this paper.

Therefore, it is desired to get a concept which provides an improved predictive video coding and encoding concept using template matching. For example, same may, for a given computation complexity, result in an increased coding and encoding efficiency and/or a reduced run-time.

SUMMARY

An embodiment may have a video decoder configured to: determine a set of search area location candidates in a reference picture of a video; match the set of search area location candidates with a current template area adjacent to a current block of a current picture to acquire a best matching search area location candidate; select, out of a search area positioned in the reference picture at the best matching search area location candidate or a predetermined search region within the search area, a set of one or more predictor blocks by matching the current template area against the search area or the predetermined search region within the search area; and predictively decode the current block from a data stream based on the set of one or more predictor blocks.

According to another embodiment, a method for video decoding may have the steps of: determining a set of search area location candidates in a reference picture of a video; matching the set of search area location candidates with a current template area adjacent to a current block of a current picture to acquire a best matching search area location candidate; selecting, out of a search area positioned in the reference picture at the best matching search area location candidate or a predetermined search region within the search area, a set of one or more predictor blocks by matching the current template area against the search area or the predetermined search region within the search area; and predictively decoding the current block from a data stream based on the set of one or more predictor blocks.

Another embodiment may have a non-transitory digital storage medium having a computer program stored thereon to perform the method for video decoding, the method having the steps of: determining a set of search area location candidates in a reference picture of a video; matching the set of search area location candidates with a current template area adjacent to a current block of a current picture to acquire a best matching search area location candidate; selecting, out of a search area positioned in the reference picture at the best matching search area location candidate or a predetermined search region within the search area, a set of one or more predictor blocks by matching the current template area against the search area or the predetermined search region within the search area; and predictively decoding the current block from a data stream based on the set of one or more predictor blocks, when said computer program is run by a computer.

Another embodiment may have a video encoder configured to: determine a set of search area location candidates in a reference picture of a video; match the set of search area location candidates with a current template area adjacent to a current block of a current picture to acquire a best matching search area location candidate; select, out of a search area positioned in the reference picture at the best matching search area location candidate or a predetermined search region within the search area, a set of one or more predictor blocks by matching the current template area against the search area or the predetermined search region within the search area; and predictively encode the current block into a data stream based on the set of one or more predictor blocks.

According to another embodiment, a method for video encoding may have the steps of: determining a set of search area location candidates in a reference picture of a video; matching the set of search area location candidates with a current template area adjacent to a current block of a current picture to acquire a best matching search area location candidate; selecting, out of a search area positioned in the reference picture at the best matching search area location candidate or a predetermined search region within the search area, a set of one or more predictor blocks by matching the current template area against the search area or the predetermined search region within the search area; and predictively encoding the current block into a data stream based on the set of one or more predictor blocks.

Another embodiment may have a non-transitory digital storage medium having a computer program stored thereon to perform the method for video encoding, the method having the steps of: determining a set of search area location candidates in a reference picture of a video; matching the set of search area location candidates with a current template area adjacent to a current block of a current picture to acquire a best matching search area location candidate; selecting, out of a search area positioned in the reference picture at the best matching search area location candidate or a predetermined search region within the search area, a set of one or more predictor blocks by matching the current template area against the search area or the predetermined search region within the search area; and predictively encoding the current block into a data stream based on the set of one or more predictor blocks, when said computer program is run by a computer.

Another embodiment may have a data stream acquired by a method for video encoding, the method having the steps of: determining a set of search area location candidates in a reference picture of a video; matching the set of search area location candidates with a current template area adjacent to a current block of a current picture to acquire a best matching search area location candidate; selecting, out of a search area positioned in the reference picture at the best matching search area location candidate or a predetermined search region within the search area, a set of one or more predictor blocks by matching the current template area against the search area or the predetermined search region within the search area; and predictively encoding the current block into a data stream based on the set of one or more predictor blocks.

An embodiment according to this invention is related to a video decoder, configured to determine a set of search area location candidates in a reference picture of a video; match the set of search area location candidates with a current template area adjacent to a current block of a current picture to obtain a best matching search area location candidate; select, out of a search area positioned in the reference picture at the best matching search area location candidate or a predetermined search region within the search area, a set of one or more predictor blocks by matching the current template area against the search area or the predetermined search region within the search area; and predictively decode the current block from a data stream based on the set of one or more predictor blocks.

This embodiment is based on the idea that it is efficient to determine a set of search area location candidates for the search area in the reference picture, then use template matching to select one of the search areas and to then use template matching within the selected search area in order to decode the current block. As an effect, it is possible to use a more precise and smaller search area, than compared to using a predetermined search area, located at a fixed/predetermined location relative to the current block. In other words, the smaller size results merely in a moderate penalty in coding efficiency as the selected search area has an increased probability to contain the best predictors anyway. The smaller size, in turn, results in a reduced computational complexity for the actual template matching. In other words, the search area has, because of the obtaining of the best matching search area location candidate, already a high probability, that the set of one or more predictor blocks in this search area will result in a very accurate decoding of the current block. This is due to the matching of the set of search area location candidates with a current template area adjacent to a current block of a current picture, which can result in a high similarity of the best matching search area location candidate and therefore a high similarity of the set of one or more predictor blocks to the current block.

The following video encoder, method for encoding a video and method for decoding a video are based on the same idea as described above in terms of the video decoder and can, by the way, be completed with all features and functionalities, which are also described with regard to the video decoder:

Video encoder, configured to determine a set of search area location candidates in a reference picture of a video; match the set of search area location candidates with a current template area adjacent to a current block of a current picture to obtain a best matching search area location candidate; select, out of a search area positioned in the reference picture at the best matching search area location candidate or a predetermined search region within the search area, a set of one or more predictor blocks by matching the current template area against the search area or the predetermined search region within the search area; and predictively encode the current block into a data stream based on the set of one or more predictor blocks.

Method for video encoding, comprising determining a set of search area location candidates in a reference picture of a video; matching the set of search area location candidates with a current template area adjacent to a current block of a current picture to obtain a best matching search area location candidate; selecting, out of a search area positioned in the reference picture at the best matching search area location candidate or a predetermined search region within the search area, a set of one or more predictor blocks by matching the current template area against the search area or the predetermined search region within the search area; and predictively encoding the current block into a data stream based on the set of one or more predictor blocks.

Method for video decoding, comprising determining a set of search area location candidates in a reference picture of a video; matching the set of search area location candidates with a current template area adjacent to a current block of a current picture to obtain a best matching search area location candidate; selecting, out of a search area positioned in the reference picture at the best matching search area location candidate or a predetermined search region within the search area, a set of one or more predictor blocks by matching the current template area against the search area or the predetermined search region within the search area; and predictively decoding the current block from a data stream based on the set of one or more predictor blocks.

BRIEF DESCRIPTION OF THE DRAWINGS

Embodiments of the present invention will be detailed subsequently referring to the appended drawings, in which:

FIG. 4 shows a schematic view of an inter prediction using template matching, which can be used by a video encoder and/or video decoder according to an embodiment of the present invention;

FIG. 7 shows a schematic view of a search area positioned in a reference picture for inter prediction by a video encoder and/or video decoder according to an embodiment of the present invention;

FIG. 9a shows a schematic view of a search progression for a first type of search region in a search area by a video encoder and/or video decoder according to an embodiment of the present invention;

FIG. 9b shows a schematic view of a search progression for a second type of search region in a search area by a video encoder and/or video decoder according to an embodiment of the present invention;

FIG. 9c shows a schematic view of a search progression for a third type of search region in a search area by a video encoder and/or video decoder according to an embodiment of the present invention;

FIG. 12 shows a table of weights for a prediction signal corresponding to a number of predictors in a set of one or more predictor blocks, which can be selected by a video encoder and/or video decoder according to an embodiment of the present invention;

FIG. 13a shows a table of a rule for a transform choice of transforms for a use on inter region-based template matching residual blocks, which can be performed by a video encoder and/or video decoder according to an embodiment of the present invention;

FIG. 13b shows a table of a rule for a general transform choice of transforms for a use on inter region-based template matching residual blocks, which can be performed by a video encoder and/or video decoder according to an embodiment of the present invention;

FIG. 15a shows a table of first experimental results for a random access configuration obtainable by a video encoder and/or video decoder according to an embodiment of the present invention; and FIG. 15b shows a table of second experimental results for a random access configuration obtainable by a video encoder and/or video decoder according to an embodiment of the present invention.

DETAILED DESCRIPTION OF THE INVENTION

Figure 1:
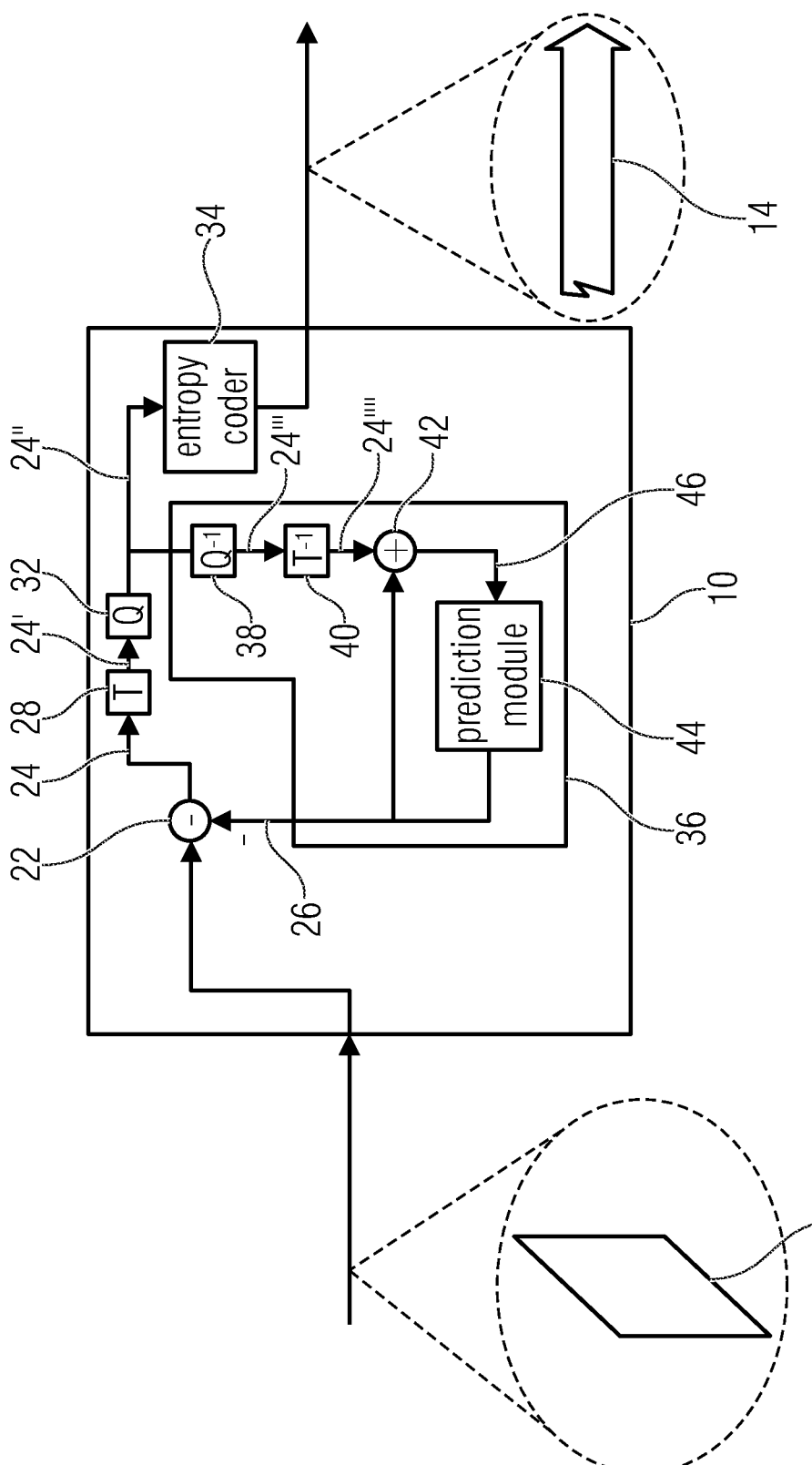
FIG. 1 shows a schematic view of a video encoder for predictively coding a picture into a data stream according to an embodiment of the present invention.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1 to 3. Thereinafter the description of embodiments of the concept of the present invention is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Figure 2:
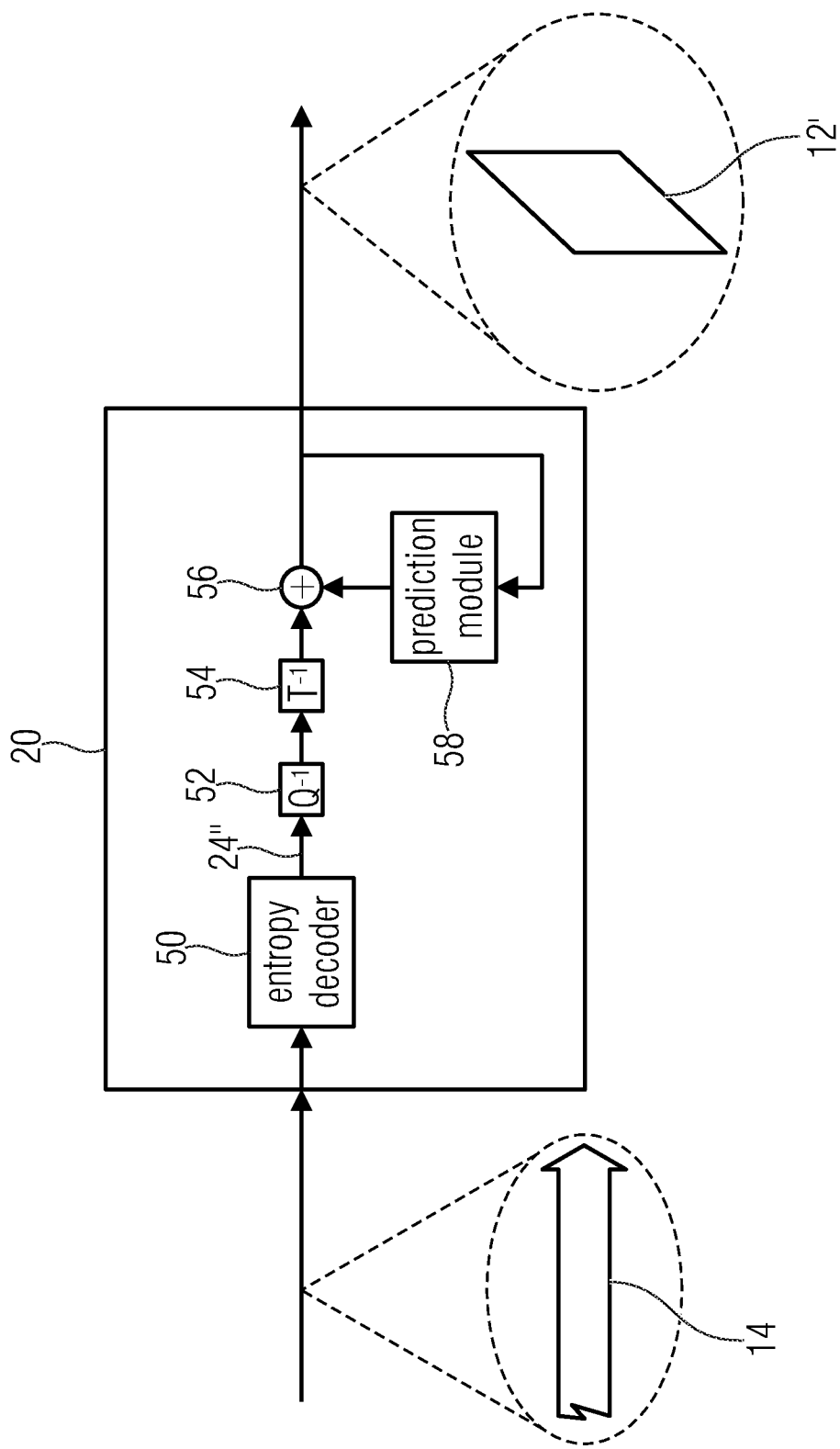
FIG. 2 shows a schematic view of a video decoder configured to predictively decode a picture from a data stream according to an embodiment of the present invention.

FIG. 1 shows an apparatus (e. g. a video encoder) for predictively coding a picture 12 into a data stream 14 exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal, thus obtained, to spectral-to-spatial transformation.

Internally, the encoder 10 may comprise a prediction residual signal former 22 which generates a prediction residual 24 so as to measure a deviation of a prediction signal 26 from the original signal, i.e. from the picture 12, wherein the prediction signal 26 can be interpreted as a linear combination of a set of one or more predictor blocks according to an embodiment of the present invention. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14.

The prediction signal 26 is generated by a prediction stage 36 of encoder 10 on the basis of the prediction residual signal 24" encoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded.

Intra-coded blocks are predicted on the basis of a spatial, already coded/decoded neighborhood (e. g. a current template) of the respective block (e. g. a current block) as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples.

Compared thereto, inter-coded blocks may be predicted, for instance, temporally. For inter-coded blocks, motion vectors may be signaled within the data stream 14, the motion vectors indicating the spatial displacement of the portion of a previously coded picture (e. g. a reference picture) of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24'', data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
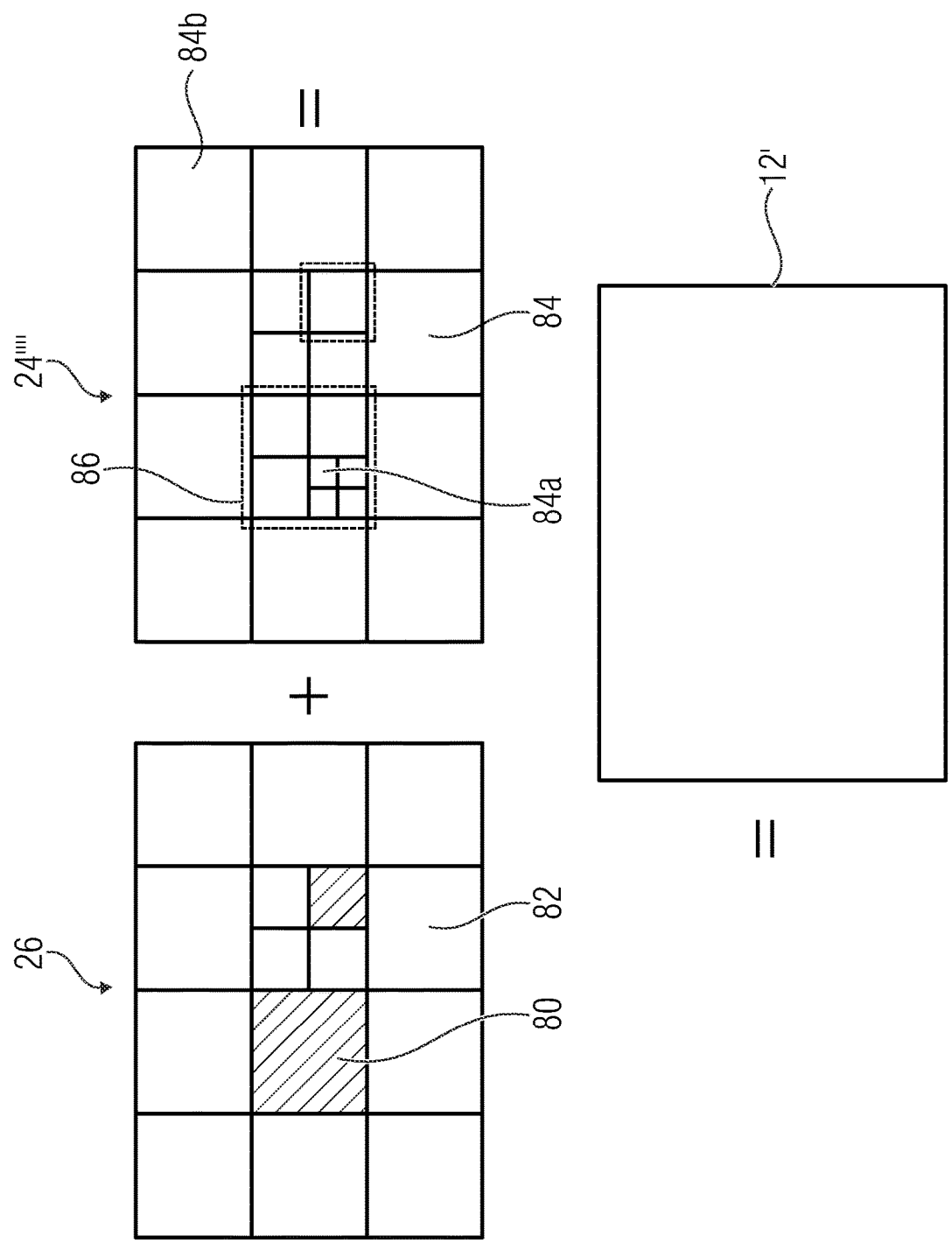
FIG. 3 shows a schematic view of a relationship between a reconstructed signal, on the one hand, and a combination of a prediction residual signal as signaled in a data stream, and a prediction signal, on the other hand, according to an embodiment of the present invention.

FIG. 3 illustrates the relationship between the reconstructed signal, i.e. the reconstructed picture 12', on the one hand, and the combination of the prediction residual signal 24'''' as signaled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24'''' in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 further illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

In FIG. 3, the transform blocks 84 shall have the following significance. Transformer 28 and inverse transformer 54 perform their transformations in units of these transform blocks 84. For instance, many codecs use some sort of DST (discrete sine transform) or DCT (discrete cosine transform) for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform, but it is also possible, that no transform is used by the encoder or decoder at all or for single blocks 80, 82, 84.

As already outlined above, FIGS. 1 to 3 have been presented as an example where the inventive concept described further below may be implemented in order to form specific examples for encoders and decoders according to the present application. Insofar, the encoder and decoder of FIGS. 1 and 2, respectively, may represent possible implementations of the encoders and decoders described herein below. FIGS. 1 and 2 are, however, only examples. An encoder according to embodiments of the present application may, however, perform block-based encoding of a picture 12 using the concept outlined in more detail below and being different from the encoder of FIG. 1 such as, for instance, in that the sub-division into blocks 80 is performed in a manner different than exemplified in FIG. 3 and/or in that no transform is used at all or for single blocks. Likewise, decoders according to embodiments of the present application may perform block-based decoding of picture 12' from data stream 14 using the coding concept further outlined below, but may differ, for instance, from the decoder 20 of FIG. 2 in that same sub-divides picture 12' into blocks in a manner different than described with respect to FIG. 3 and/or in that same does not derive the prediction residual from the data stream 14 in transform domain, but in spatial domain, for instance and/or in that same does not use any transform at all or for single blocks. According to an embodiment the inventive concept described further below can be implemented in the prediction module 44 of the video encoder or in the prediction module 58 of the video decoder. According to an embodiment the inventive concept described further below can be implemented in the prediction stage 36 of the encoder or in the dequantizer 52, inverse transformer 54, combiner 56 and prediction module 58 of the decoder.

FIG. 4 shows a schematic view of an inter prediction using template matching, which can be used by a video encoder and/or video decoder according to an embodiment of the present invention. In other words FIG. 4 shows an inter region-based template matching prediction or a region-based template matching for decoder-side and/or encoder-side motion vector derivation.

The video decoder/video encoder is configured to determine a set of search area location candidates in a reference picture 12" of a video; match the set of search area location candidates with a current template area 110 adjacent to a current block 120 of a current picture 12' to obtain a best matching search area location candidate; select, out of a search area positioned in the reference picture 12" at the best matching search area location candidate or a predetermined search region within the search area, a set of one or more predictor blocks 120' by matching the current template area 110 against the search area or the predetermined search region within the search area; and predictively decode/encode the current block 120 from/into a data stream based on the set of one or more predictor blocks 120'.

In the following a plurality of details is set forth to provide a more throughout explanation of embodiments of the present invention. However, it will be apparent to those skilled in the art that specific details of embodiments of the present invention described with respect to the video decoder may be practiced by a video encoder and that specific details of embodiments of the present invention described with respect to video encoder details may be practiced by a video decoder.

Template matching is a texture synthesis method used in digital image processing. According to an aspect of the invention, an advanced and faster version of this technique is developed for the inter prediction of video coding. The proposed method does, for example, not send the motion vectors to the decoder, i.e. the relative displacements of the current block on the one hand and the regions of the reference picture from which the current block is predicted on the other hand. Instead they are derived in a predetermined manner which may also be applied at the decoder. The region-based template matching (RTM) for inter prediction is described in the following:

A template (110, 110') is referred to as neighboring samples, e. g. two lines of reconstructed samples, present above and left of a block (120, 120'). That is, a template is a set of samples neighboring a certain block, which have a predetermined relative position to the block. They may, for instance, be located to the left and top of the block and cover immediate neighboring samples and, optionally, one or more further lines of samples which are one, two or any other number of samples away from the block's border. These samples of the template are typically already coded/reconstructed. This is true for blocks in a reference picture as the coding order may traverse the pictures of the video sequentially and, accordingly, the reference picture may have been coded/decoded completely in coding order before the current block is up to coding/decoding. This is true for the current block's template as well as the coding order leads generally in a raster scan order from top to bottom, leading row wise from left to right, with the current picture. Alternatives are, naturally, possible with respect to the coding order. For instance, the coding order may be a mixture of a raster scan order with respect to tree-root blocks into which the pictures are regularly partitioned in rows and columns, with traversing the leaf blocks of each recursively partitioned tree root block in a depth first traversal order.

Consider a block, e. g. the current block 120, which can comprise a luma block, to be predicted, as shown in FIG. 4. The template 110 of the current block B 120 in the current picture 12' is called the current template $T_c$ 110 and any template that is present in the reference picture 12" (i.e. reference frame) is called a reference template, the reference template area 110' or $T_r$. The latter adjoins an associated reference block P, which is a potential candidate for predicting block 120. For example, the relative position and location between current block and its template equals or is congruent to the relative position and location between a reference block and its template. The objective is to find the best match $T_b$ (best Template) from, for example, a large pool of reference templates $T_r$. In other words the objective is to find the reference block P (for example, 120') whose reference templates $T_r$ 110' fits best to the current template 110 (than this reference template $T_r$ 110' is the best match $T_b$), so that this block P (e. g. the predictor block P 120') associated with reference templates $T_r$ may favorably be used as the predictor of the current block B 120. According to an embodiment the reference template $T_r$ 110' shown in FIG. 4 represents the best template or synonymous the best match $T_b$. In the following the reference picture 12" can also be understood as a reference frame and the current picture 12' can also be understood as a current frame.

Any matric for measuring the similarity between templates can be used for template matching procedures used herein. An example for an error minimizing metric is a sum of squared differences (SSD). Same can be used to find the best match $T_b$ from the large pool of reference templates $T_r$ 110' available in the reference pictures 12". The reference template 110' that gives the error value associated with highest similarity, such as the least one when using SSD, is considered as the best template match $T_b$ for the current block 120 and the block (e.g. the predictor block 120') corresponding to the best template match is, for example, the predictor of the current block 120. It should be noted here that the search algorithm is, for example, applied at integer-sample positions.

The search for the best template match $T_b$ in the reference picture 12" is, for example, restricted or confined to a window (e. g. a search area 130), e.g. square shaped, whose central position is, for example, C. In accordance with the examples set out herein below, C is selected out of several candidate positions for C. In accordance with these embodiments, this selection is also done by template matching. The finally chosen C, i.e. the C of the search area 130 within which the actual template matching to find the one or more reference blocks is performed, can represent the best matching search area location candidate.

Figure 6:
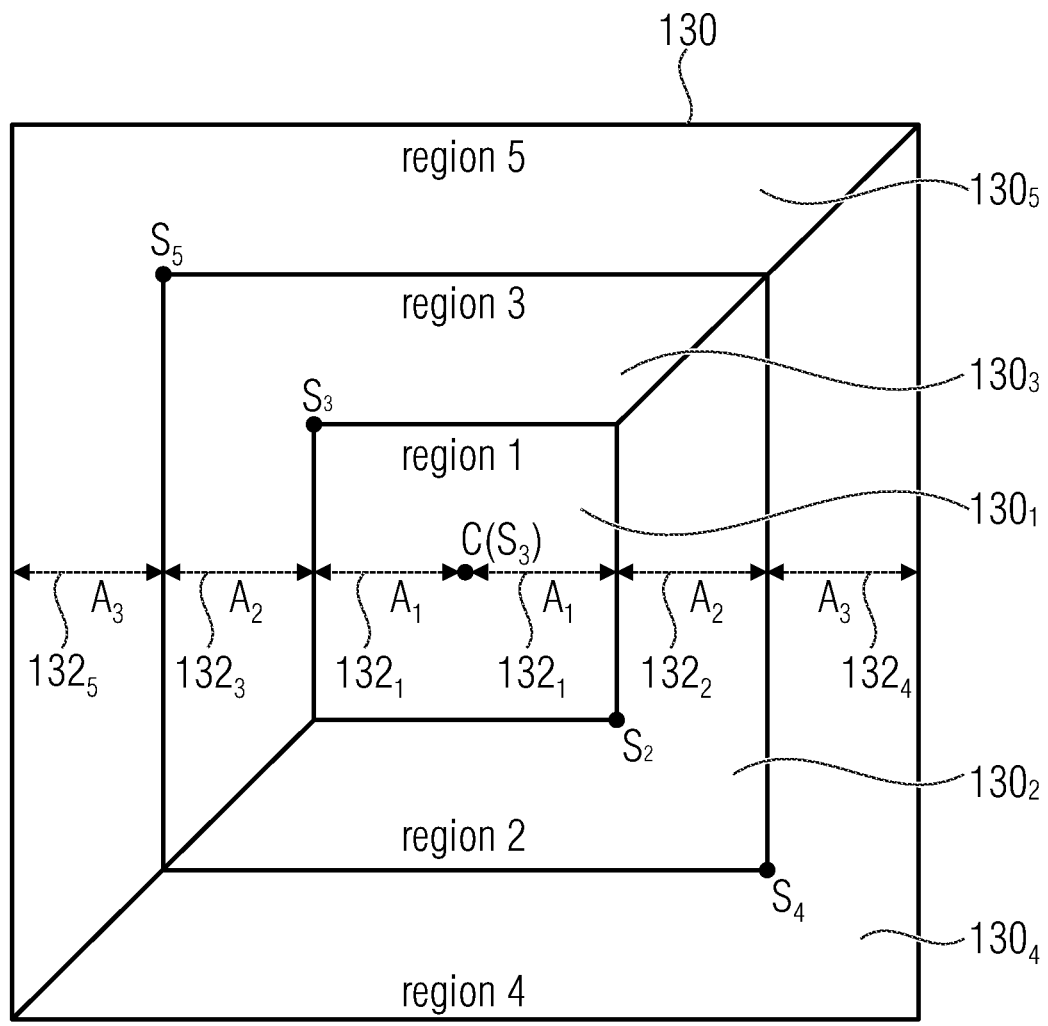
FIG. 6 shows a schematic view of a search area used for inter prediction by a video encoder and/or video decoder according to an embodiment of the present invention.

In accordance with certain embodiments, which are further described below, the search area 130 is, for example, further partitioned into, for example, n regions in a predetermined manner. According to an embodiment, the search area 130 is partitioned, for instance, into five regions where C is the central position of the search area (see FIG. 6 and FIG. 7). The search area is not restricted to have an rectangular or quadratic shape as depicted in FIG. 6. According to alternative embodiments the search area 130 has a round shape, an oval shape, a polygonal shape or etc.

Figure 5:
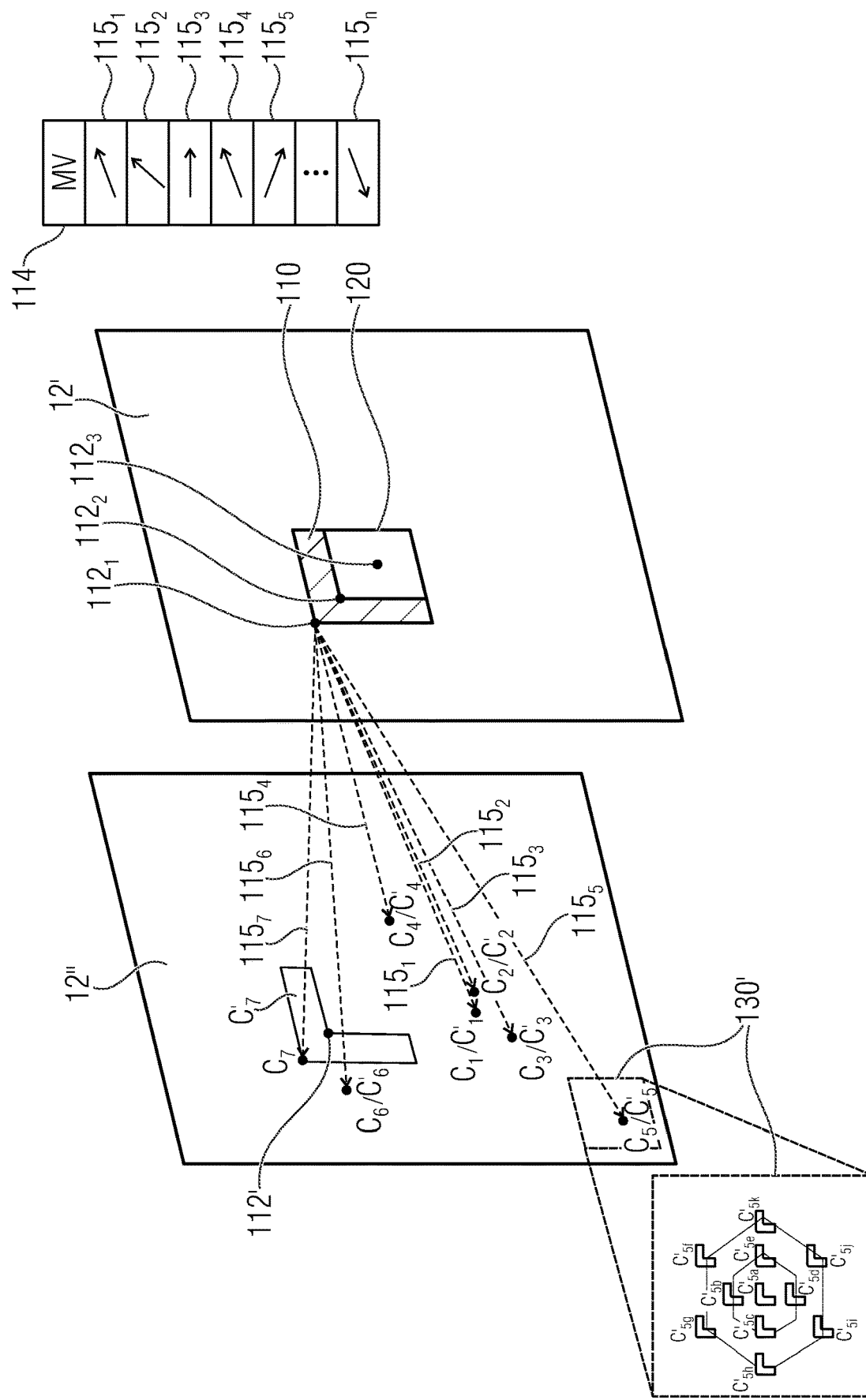
FIG. 5 shows a schematic view of a determination of a set of search area location candidates in a reference picture by a video encoder and/or video decoder according to an embodiment of the present invention.

The central position, C, should be chosen wisely, since this can have a direct impact on the efficiency of the RTM prediction. A badly chosen central position can lead to poor predictors and wastage of time from the search algorithm. In order to handle this issue, the subsequently described embodiments have, for example, a separate design to decide the central position before the start of the actual search algorithm for the RTM predictors (i.e. the set of one or more predictor blocks). In this step, encoder and decoder look into a list 114 of motion vector predictors $115_1$ to $115_n$ for the current block 120, wherein n can be a positive integer like, for example, 7 as illustrated in FIG. 5 on the left hand side. The predicted motion vectors $115_1$ to $115_n$ in this list 114 are derived, for instance, from neighboring blocks. That is, the list 114 may collect motion vectors $115_1$ to $115_n$ derived from motion vectors used to decode/code inter-predicted blocks spatially and/or temporally neighboring the current block. Such motion vector predictor candidate list 114 would be, for instance, used for the current block 120 if same had been coded using a normal inter-prediction mode including the signaling of a motion vector difference to a motion vector prediction candidate chosen out of that list 114. The encoder might have used this list in order to test this normal mode before finally choosing, for instance, the TM mode (template matching mode) discussed herein. The decoder may derive the list 114, though the current block 120 is signaled to be coded in the TM mode for sake of determining C. Alternatively or additionally, the MV predictor list 114 is used in merge mode. It should be noted, however, that the existence of the just-mentioned alternative modes is merely optional. There may be merely the TM mode discussed herein with decoder and encoder forming the MV list 114 just for sake of choosing the best C. Each vector $115_1$ to $115_n$ in the list 114 points, relative to, or from, the current block 120, to an associated candidate position (see, for example, $C_1$ to $C_7$ in FIG. 5) for C. The motion vectors $115_1$ to $115_n$ indicate a relative displacement between block 120 on the one hand and corresponding, i.e. congruent, portions in the reference picture on the other hand. The motion vectors $115_1$ to $115_n$ may be used to locate candidate positions $C_1$ to $C_n$ by using one of the top left corner $112_1$ of the current template 110, the top left corner $112_2$ of the current block 120 or the middle $112_3$ of the current block 120 as a base point of the motion vectors. Rounding to an integer position may be applied additionally as outlined further below. The candidate position for $C_1$ to $C_7$ of each of the MV candidates $115_1$ to $115_n$ in the list 114 forms a new list called the RTMpredList in the following.

To be more precise, according to an embodiment a separate design similar to PMVD (pattern matched motion vector derivation) in Joint Exploration Model (JEM) of JVET (Joint Video Exploration Team) [11] is used to identify C (e.g. a position of C, wherein C can define a search area location candidate) in the reference picture 12" in order to improve the efficiency of an inter RTM (region-based template matching) mode. In this step, a list of candidates for C, for example, the set of search area location candidates $C_1$ to $C_7$ as shown in FIG. 5, e.g. called RTMpredList, is generated. The set of search area location candidates $C_1$ to $C_7$ can represent positions $C_1$ to $C_7$ in the reference picture 12". By means of each of these candidate positions $C_1$ to $C_7$, a position of the search area 130 is defined in that, as explained above, the respective candidate position is defined to form the search area's center. A different definition would, naturally, be feasible as well such as defining the search area's upper left corner. For sake of choosing one of the positions candidates, each position candidate may define one or more template areas $C'_1$ to $C'_7$ using which the selection among the candidate positions $C_1$ to $C_7$ may be performed by matching against the current template 110. FIG. 5 illustrates one template area $C'_7$ and the other template areas $C'_1$ to $C'_6$ can resemble $C'_7$, wherein the template areas $C'_1$ to $C'_7$ being defined for each of the candidate positions $C_1$ to $C_7$ to be positioned so that its upper left corner coincides with the respective one of the candidate positions $C_1$ to $C_7$. This is merely an example, however, with further details set out herein below. The number 7 has been chosen merely for illustration purposes. Any number may apply.

The candidates $C'_1$ to $C'_7$ are compared to $T_c$ 110 to select the best one. In other words the set of search area location candidates $C_1$ to $C_7$ are matched with a current template area 110 adjacent to a current block 120 of a current picture 12' to obtain the best matching search area location candidate.

According to an embodiment this can mean, that one template area $C'_1$ to $C'_7$ at each position candidate $C_1$ to $C_7$ is compared to the current template area $T_c$ 110 such as the one ($C'_7$) depicted in FIG. 5 for each candidate position. That is, among location candidates $C_1$ to $C_7$ the one would be chosen whose template area $C'_1$ to $C'_7$ is most similar to the current template $T_c$ 110.

According to an alternative embodiment, for each candidate of the set of search area location candidates $C_1$ to $C_7$, several templates, like $C'_{5a}$ to $C'_{5k}$ as illustrated in FIG. 5 for the candidate $C_5$, are used in the C selection process, namely for each location candidate $C_1$ to $C_7$, several templates, e.g. $C'_{5a}$ to $C'_{5k}$, distributed over a candidate search area 130' positioned at the respective candidate positon $C_1$ to $C_7$. For each location candidate $C_1$ to $C_7$, the several templates, e.g. $C'_{5a}$ to $C'_{5k}$, are then compared to the current template area $T_c$ 110. The one candidate that leads to the least SSD error is chosen as the central position C. For instance, the one is chosen, whose templates, e.g. $C'_{5a}$ to $C'_{5k}$, which are distributed over its correspondingly positioned candidate search area 130', are most similar to the current template 110 when averaging or summing-up the similarity over the templates, e.g. $C'_{5a}$ to $C'_{5k}$, or subjecting the similarities obtained for the templates distributed within the search area positioned at a certain candidate position, such as $C'_{5a}$ to $C'_{5k}$ for $C_5$, to a function yielding a maximum of these similarities.

Again, it should be noted that the central positioning of a candidate position $C_5$ with respect to its associated candidate search area 130' is merely an example. Instead, the positions $C_1$ to $C_7$ to which the motion vector predictor candidates $115_1$ to $115_7$ point, may be defined to form a top left most corner of its candidate search area 130'. The distribution of template areas, e.g. $C'_{5a}$ to $C'_{5k}$, within the corresponding candidate search area 130', may be predefined any may be equal for each position candidate $C_1$ to $C_7$. According to an embodiment the several templates, e.g. $C'_{5a}$ to $C'_{5k}$, can be determined in the candidate search area 130' by a hexagonal search as illustrated in FIG. 5, but alternative search algorithms like a row-wise raster search order from the top of the candidate search area 130' to the bottom of the candidate search area 130' can also be applied.

In other words the separate design similar to PMVD in JEM of JVET is used to identify the point C of the finally chosen search area 130 in the reference picture 12" in order to improve the efficiency of the inter RTM mode. In this step an already available predictor list for the motion vector of the current block 120 is used to generate a new list called the RTMpredList. In particular, each motion vector in the list is used to locate a candidate point for C in the reference picture. The candidate points are listed in RTMpredList. This means, that the proposed algorithm at first determines the positions $C_1$ to $C_7$ in the reference picture 12" and collects them in a first list. This is done at decoder and encoder based on the predictor list for the motion vector. Then, encoder and decoder perform template matching to select one of the candidate positions in the new list. For each of the list members, one or more templates are determined so, for instance, the relative spatial arrangement relative to the respective position candidate $C_1$ to $C_7$ is the same among all position candidates. In FIG. 5, merely one template $C'_1$ to $C'_7$ per candidate position $C_1$ to $C_7$ is exemplarily shown. In case of more than one template for a respective search area position candidate, the similarity to the current template is averaged over the more than one template defined for the respective position candidate.

In other words the video decoder and encoder can be configured to determine the set of search area location candidates using one or more motion vector predictors spatially and/or temporally predicted for the current block.

The RTMpredList (i. e. the set of search area location candidates $C_1$ to $C_7$) is, for example, created from an advanced motion vector prediction (AMVP) [1] candidate list of the current block 120. Already decoded motion vectors (MVs) of spatial neighboring blocks (e. g. in the current picture 12') and temporal neighboring blocks (e. g. in the reference picture 12") are, for example, utilized for generating the AMVP list. According to an embodiment the positions in the reference picture pointed to the motion vectors in the AMVP list, mapped to integer-sample position, are used to form the RTMpredList.

In other words video decoder and encoder can be configured to round the one or more motion vector predictors to integer-sample positions in order to obtain the set of search area location candidates $C_1$ to $C_7$.

In accordance with an embodiment, if the position in the reference picture which is co-located to the position of the current template $T_c$ 110, i.e. the position in the reference picture 12" pointed to by a zero motion vector, is not already present in the position candidate list (i. e. the set of search area location candidates $C_1/C'_1$), video encoder and decoder add same to the list before performed the selection of the best search area candidate position out of the list. In FIG. 5, $C_7$ is, for instance, co-located to the current template $T_c$ 110. If the template position $C_7$ corresponding to the template 110 of the current block 120, i.e. being co-located thereto in the reference frame 12", was not present in the RTMpredList, then it would be added. See, for example, in FIG. 5 the candidate $C_7$, which corresponds to a position 112 of the current template $T_c$ 110, or the candidate $C'_7$, which corresponds to the current template $T_c$ 110.

In other words the video decoder and/or video encoder can be configured to check whether a predicted search area location $C_7/C'_7$ in the reference picture 12", colocated to the current template area 110 of the current block 120, is contained in the set of search area location candidates $C_1$ to $C_7$, if not, add the predicted search area location $C_7$ to the set of search area location candidates $C_1$ to $C_7$.

Figure 10:
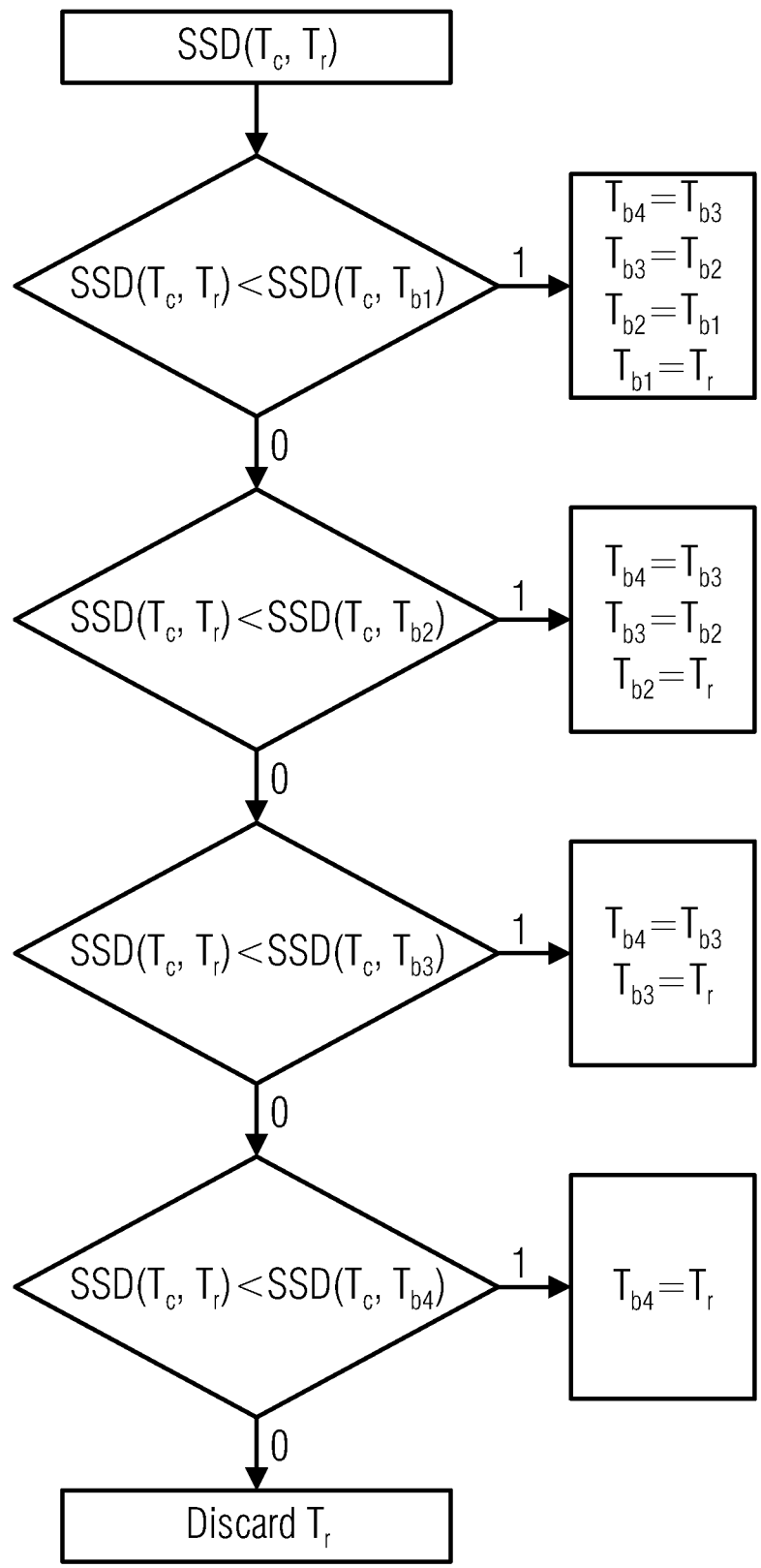
FIG. 10 shows a flow chart of a rule for selectin a best template match by a video encoder and/or video decoder according to an embodiment of the present invention.

Now, the encoder or decoder needs to find the best template, i. e. the best matching search area location candidate, from this list according to an embodiment. The simplest and fastest way is to choose the template (e. g. one of the templates $C'_1$ to $C'_7$) that leads to the least error (SSD) with the current template 110 (see e. g. FIG. 10 for the algorithm). A more robust option is to do motion estimation trials for each candidate $C_1$ to $C_7$ in the list using template matching (The error minimizing metric used is SSD). A faster and reliable search algorithm, like, for example, hexagonal search (see FIG. 5), should be applied in this stage. This is to keep the time spend on this step to the minimum. For example, the candidate $C_1$ that gives the least error among them is chosen as the best template $C'_1$. For example, the central position C, in FIG. 7, is the position $C_1$ corresponding to the top-leftmost position of the best candidate template $C'_1$. Alternatively the central position C, in FIG. 7, is a different corner of the best candidate template $C'_1$, like a position 112' illustrated in the candidate template $C'_7$.

In the following embodiments details described above are described in other words:

According to an embodiment the video decoder and/or video encoder is configured to, in matching the set of search area location candidates $C_1$ to $C_7$, especially, for example, the candidate templates $C'_1$ to $C'_7$, with a current template area 110, for each of the set of search area location candidates $C_1$ to $C_7$, determining a similarity of the reference picture 12", at one or more positions, at (e. g. at $C_1$ to $C_7$) and/or around (e. g. $C'_{5a}$ to $C'_{5k}$), the respective search area location candidate $C_1$ to $C_7$, to the current template area 110, appoint a search area location candidate, e. g. one of $C_1$ to $C_7$, the best matching search area location candidate for which the similarity is highest.

According to an embodiment the video decoder and/or video encoder is configured to determine the similarity by way of a sum of squared sample differences.

According to an embodiment the video decoder and/or video encoder is configured to determine the similarity at the one or more positions (at and/or around, the respective search area location candidate $C_1$ to $C_7$) by determining the sum of squared sample differences between the current template area 110 and a coshaped candidate template area $C'_1$ to $C'_7$ at the one or more positions $C_1$ to $C_7$ in the reference picture 12", wherein the best matching search area location candidate is associated with a least sum of squared sample differences out of a set of sum of squared differences.

Once the position of C is determined, borders of search regions in the search area can be decided or calculated as, for example, in FIG. 6 and FIG. 7. A width M (e. g. the search window/search area size) of the search area 130 can be calculated as in (1), where A1 132$_1$, A2 132$_2$, A2 132$_3$, A3 132$_4$ and A3 132$_5$ are widths (or sizes) of region 1, 2, 3, 4 and 5 respectively. Thus FIG. 6 and FIG. 7 show different regions (search regions) of fast template matching for inter prediction, for n=5. The values of A1 132$_1$, A2 132$_2$, 132$_3$ and A3 132$_4$, 132$_5$ are correlated to the total area, of the search area 130 being searched for the best template match $T_b$. Therefore, they can directly affect the run-time of the proposed method. Note that A1 132$_1$, A2 132$_2$, 132$_3$ and A3 132$_4$, 132$_5$ can be tuned for different combinations of coding gain and decoder complexity.

$$M=(2A_1+1)+2A_2+2A_3, \tag{1a}$$

or more general:

$$M=(2A_1+1)+2A_2+2A_3+2A_4+\ldots+2A_n, \quad (1b)$$

wherein n defines a number of search regions and is a positive integer.

In the following embodiments details described above are described in other words:

An embodiment wherein the search area 130 is subdivided into search regions (Region 1 to Region 5), and the video decoder and/or video encoder is configured to select the predetermined search region out of the search regions (e. g. one of Region 1 to Region 5) based on a signalization in the data stream; and restrict the selection of the set of one or more predictor blocks 120', by matching the current template area 110 against the search area 130, to the predetermined search region (e. g. one of Region 1 to Region 5).

Figure 11:
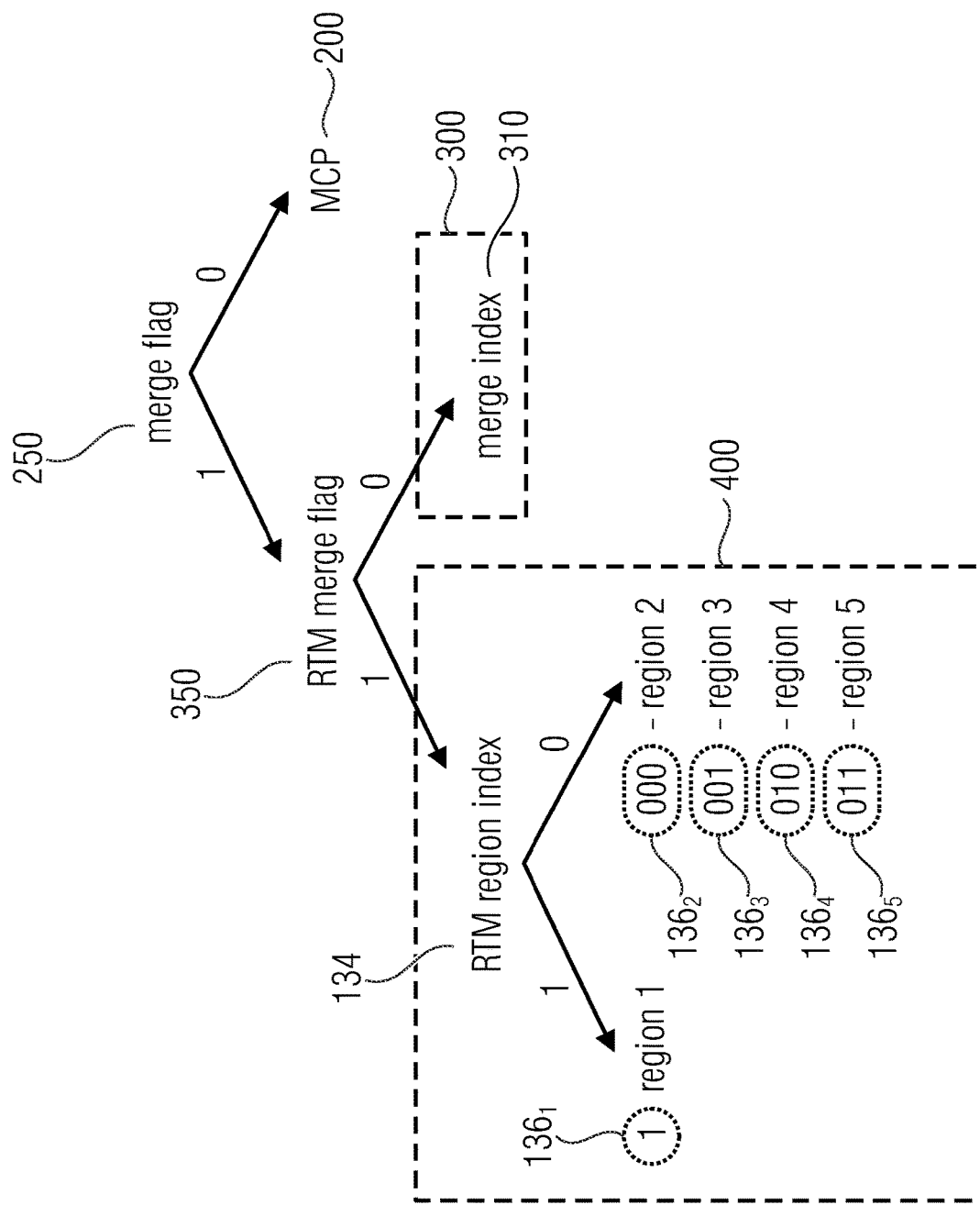
FIG. 11 shows a flow chart of syntax elements for an inter region-based template matching merge mode, which can be used by a video encoder and/or video decoder according to an embodiment of the present invention.

An embodiment, wherein the search area 130 is subdivided into the search regions (Region 1 to Region 5) so that a first search region (Region 1) is arranged in a middle of the search area 130 and further search regions (Region 2 to Region 5) are in a manner surrounding the first search region (Region 1) (see FIG. 6 and FIG. 7), and wherein the signalization comprises a search region index 134 indexing the predetermined search region out of the search regions (Region 1 to Region 5), and wherein the video decoder and/or video encoder is configured to decode/encode the search region index 134 from/into the data stream using a variable length code $136_1$ to $136_5$ which assigns a first codeword $136_1$ of a shortest codeword length of the variable length code to the first search region (Region 1) (see FIG. 11).

An embodiment, wherein the search area 130 is subdivided into the search regions (Region 1 to Region 5) so that each of the further search regions (Region 2 to Region 5) extends circumferentially around the first region (Region 1) in an incomplete manner (see FIG. 6 and FIG. 7) and wherein the variable length code $136_1$ to $136_5$ assigns second codewords $136_2$ to $136_5$ to the further search regions (Region 2 to Region 5) which are of mutually equal length (see FIG. 11).

According to an embodiment the encoder and/or decoder can be configured to search for a best template match, by matching the current template area 110 against the search area 130, wherein a selection of the set of one or more predictor blocks can be based on the best template match. According to an embodiment The proposed RTM algorithm uses, for example, a linear search method. For example, for each search region (e. g. region 1 to region 5), the search for the best template match starts from the starting position S and progresses towards the outer borders (see FIG. 6, FIG. 9a, FIG. 9b and FIG. 9c). For the example of n=5, the starting position of the search method for Region 1, 2, 3, 4, 5 are $S_1, S_2, S_3, S_4, S_5$ respectively (see FIG. 6). The way the search progresses depends, for example, on the region type. For Region1 (FIG. 9a), the starting position is compared with the current template area 110 in the beginning. In a first iteration, the templates 110' that are present at 1-sample position from S are, for example, compared to the current template area 110. In a second iteration, the templates 110' that are present at 2-sample positions from S are, for example, compared to the current template area 110. See in FIG. 9a the search progression for Region 1. This continues until it reaches the outer borders of the region.

For other regions also the search may be carried out in the same manner. However, only in one direction. For Region 2 and 4, the search progresses, for example, towards its bottom-right corner (see FIG. 9c). In the case of Region 3 and 5, the search is done, for example, towards its top-left corner (see FIG. 9b). The rule for the search algorithm (rule for finding the best template matches) is explained in the flowchart in FIG. 10 for the case of k=4.

Figure 8:
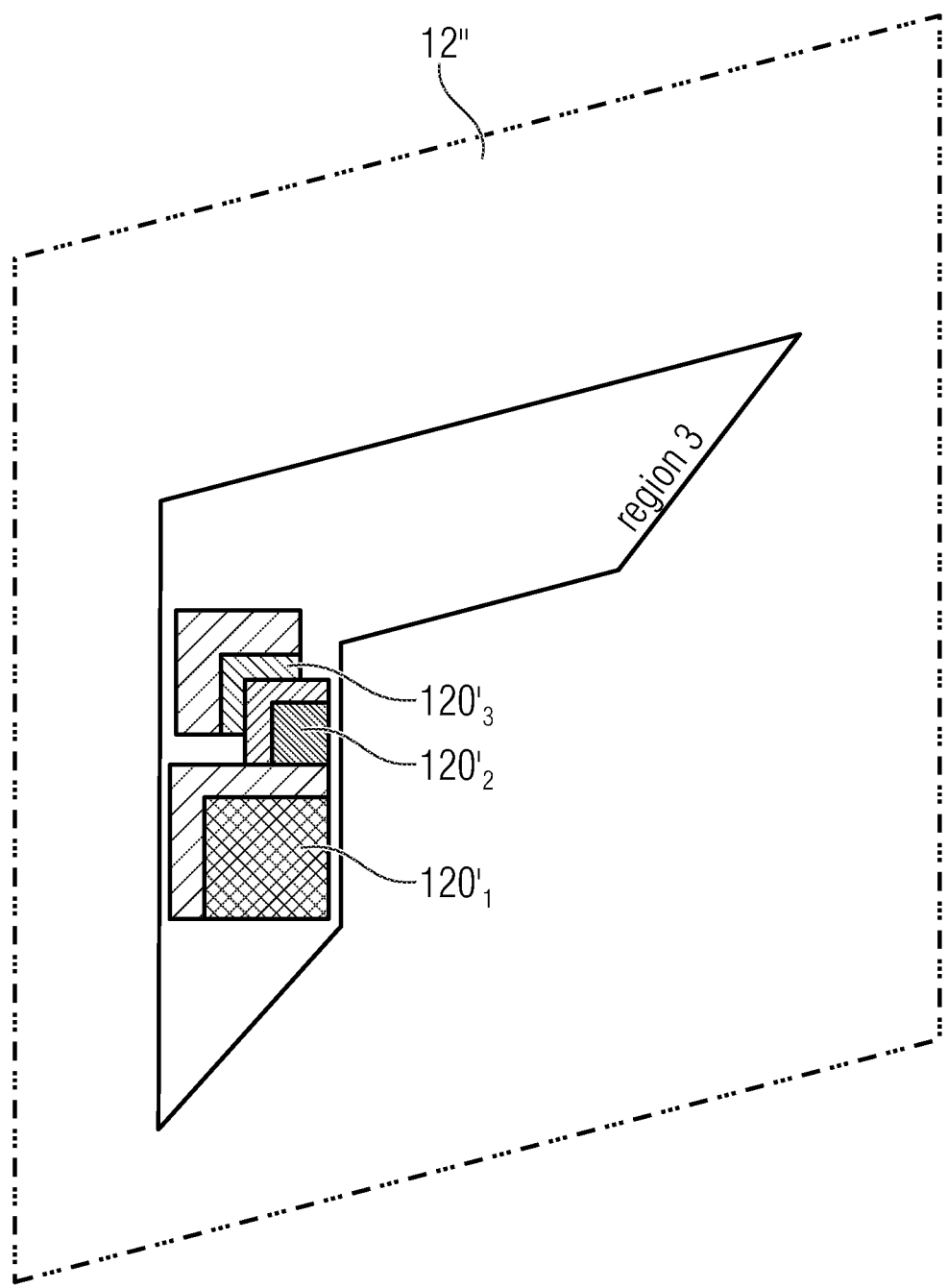
FIG. 8 shows a schematic view of a selection of a set of one or more predictor blocks by a video encoder and/or video decoder according to an embodiment of the present invention.

For a given region, e. g. region 3 according to FIG. 8, the proposed method finds k number of predictors 120' from each reference list through template matching, e. g. 3 predictors 120'$_1$ to 120'$_3$ according to FIG. 8. Thus, there are k or 2k number of predictors for a uni-predictive or bi-predictive picture respectively. The final prediction signal is, for example, a linear combination of these predictor blocks 120'$_1$ to 120'$_3$.

According to an embodiment there will be, for example, k and/or 2k (e. g. for a uni-predictive or bi-predictive picture respectively) number of predictors for P frame (110' and/or 120') and B frame (110 and/or 120) respectively.

In other words the video decoder and/or video encoder is configured to decode/encode the current block 120 by determining a linear combination of the set of one or more predictor blocks, e. g. the set of one or more predictor blocks 120' in FIG. 1 or the set of one or more predictor blocks 120'$_1$ to 120'$_3$ in FIG. 8.

As in a typical inter prediction method, the predictors 120'$_1$ to 120'$_3$ for the current luma block are found through the inter RTM method. The predictors for the chroma blocks are, for example, obtained by mapping the luma block predictors to that of the chroma blocks based on the chroma sub-sampling ratio. It should be noted here that, according to an embodiment, all search algorithms related to RTM mode are applied at integer-sample positions.

The inter RTM mode finds k predictors 120'$_1$ to 120'$_3$ from each reference list. The value of k is, for example, determined based on two criteria. First, it should be greater than 1, since for a template matching approach using multiple predictors 120'$_1$ to 120'$_3$ typically improves the coding performance [14], [15]. Second, the value of k should be a power of 2 for ease of hardware implementation. Thus, the value of k is chosen to be 4 in an embodiment. Nevertheless it is also possible to have 3 predictors 120'$_1$ to 120'$_3$ like in FIG. 8. The proposed method sorts the 2k predictors 120'$_1$ to 120'$_3$ (k predictors for uni-predictive pictures) based, for example, on their SSD errors in ascending order and the number of predictors 120'$_1$ to 120'$_3$ used for final prediction of the current block depends on the error value of the first predictor in the sorted list.

According to an embodiment Let $P_{mr}$ be a general expression for a predictor 120'$_1$ to 120'$_3$, where r is a reference list index with r=0, 1 and m is an index of the predictor 120'$_1$ to 120'$_3$ from each list with $1 \le m \le k$. Let optionally $e_{mr}$ be the SSD error associated with $P_{mr}$ such that $e_{1r} \le e_{2r} \le e_{3r} \le e_{4r}$. The proposed method sorts all the predictors 120'$_1$ to 120'$_3$ together based on their SSD errors, for example, in ascending order and discards those that have an error greater than a threshold error (see FIG. 10). The threshold error ethres depends, for example, on the error value of the first predictor in the above sorted list.

If $P_i$ is the set of sorted predictors (i. e. the set of one or more predictor blocks), then the prediction signal is given by (3) where $w_{il}$ is the corresponding weight of the predictors 120'$_1$ to 120'$_3$ and they are decided based on the table in FIG. 12. l is the number of predictors that have an error value less than or equal to the threshold error $e_{thres}$ and optionally l can be associated with the number of predictors in the sorted list. For the ease of hardware implementation, according to an embodiment only powers of 2 are considered as weights.

Further, for every value of 1, the weights are, for example, formed such that the sum of weights (denominator of (3)) will result in a power of 2.

$$P_{final} = \frac{\sum_{i=1}^{l} P_i w_{il}}{\sum_{i=1}^{l} w_{il}} \qquad (3)$$

In the following embodiments details described above are described in other words:

According to an embodiment the video decoder and/or video encoder is configured to decode/encode the current block 120 based on an average, such as a normal average, a weighted average, or a combination of both, of the set of one or more predictor blocks $P_{mr}$, or based on an average of a subset $P_i$ out of the set of one or more predictor blocks $P_{mr}$ with the subset $P_i$ excluding predictor blocks P from the set of one or more predictor blocks $P_{mr}$ whose (whose is understood as the predictor blocks to be excluded from the set of one or more predictor blocks $P_{mr}$) reference template area 110' matches with the current template area 110 more than a predetermined threshold $e_{thres}$ worse than that for a best matching predictor block (e. g. $P_1$ of the sorted predictors) in the set of the one or more predictor blocks $P_{mr}$.

According to an embodiment the video decoder and/or video encoder is configured to, in predictively decoding/encoding the current block 120 from/into a data stream based on the set of one or more predictor blocks $P_{mr}$, sort and weight the set of the one or more predictor blocks $P_{mr}$ (e.g. to determine the sorted set of one or more predictor blocks $P_1$ to $P_n$ and to weight this the sorted set of one or more predictor blocks $P_1$ to $P_n$) based on a similarity of a reference template area 110' of each of the predictor blocks $P_i$ and the current template area 110, and determine the current block $P_{final}$ 120 according to $$P_{final} = \frac{\sum_{i=1}^{n} P_i w_{il}}{\sum_{i=1}^{n} w_{il}},$$

wherein $P_i$ is a predictor block of the sorted set of one or more predictor blocks $P_1$ to $P_n$, wherein $w_{il}$ is a weighing factor applied to the predictor block $P_i$, wherein i is an index associated with a position of the predictor block $P_i$ in the sorted set of one or more predictor blocks $P_1$ to $P_n$, wherein n is an index associated with a total number of predictor block $P_i$ in the sorted set of one or more predictor blocks $P_1$ to $P_n$, and wherein 1 is an index associated with the number of predictor blocks $P_i$ in the sorted set of one or more predictor blocks $P_1$ to $P_n$, whose reference template area matches with the current template area more than a predetermined threshold $e_{thres}$, wherein the predetermined threshold $e_{thres}$ is based on the highest similarity. According to an embodiment 1=n.

In other words let the predictors from a first reference list be $P_{10}, P_{20}, P_{30}, \ldots, P_{k0}$ with SSD errors $e_{10}, e_{20}, e_{30}, \ldots, e_{k0}$ respectively, where $e_{10} \leq e_{20} \leq e_{30} \leq \ldots \leq e_{k0}$. Similarly, the predictors from a second reference list are, for example, $P_{11}, P_{21}, P_{31}, \ldots, P_{k1}$ with SSD errors $e_{11}, e_{21}, e_{31}, \ldots, e_{k1}$ respectively, where $e_{11} \leq e_{21} \leq e_{31} \leq \ldots \leq e_{k1}$. Thus according to an embodiment the set of one or more predictors can comprise more than one list of predictors, wherein each list can comprise more than one predictor. According to an embodiment each of t lists of predictors can represent predictors selected in one reference picture out of t numbers of reference pictures. According to an embodiment each of t lists of predictors can represent predictors selected in one search region out of t numbers of search regions in the search area 130 of the reference picture 12".

The final prediction signal of the current block 120 is, for example, the weighted average of the predictors given by, $$P_{final} = \frac{(w_{10}P_{10} + w_{20}P_{20} + \ldots + w_{k0}P_{k0} + w_{11}P_{11} + w_{21}P_{21} + \ldots + w_{k1}P_{k1})}{(w_{10} + w_{20} + \ldots + w_{k0} + w_{11} + w_{21} + \ldots + w_{k1})} \qquad (4)$$

where $w_{10}, w_{20}, \ldots, w_{k0}$ are the weights associated with the predictors $P_{10}, P_{20}, \ldots, P_{k0}$ respectively and $w_{11}, w_{21}, \ldots, w_{k1}$ are the weights associated with the predictors $P_{11}, P_{21}, \ldots, P_{k1}$ respectively.

According to the embodiment of FIG. 8 the number of predictors 120'₁ to 120'₃ in the reference picture 12" is three, i.e. k=3, whereby the predictor 120'₁ can be associated with the predictor $P_{10}$, the predictor 120'₂ can be associated with the predictor $P_{20}$ and the predictor 120'₃ can be associated with the predictor $P_{30}$.

The proposed method produces, for example, individual prediction signals from each region of the search area. The encoder, for example, decides the best prediction signal based on a rate-distortion optimization algorithm. The region that gives the best prediction is considered as the best region. The information related to the best region is send to the decoder. According to an aspect of the invention, the decoder reads the information related to the chosen region from the bitstream (i. e data stream) and repeats the search algorithm only in that region.

The final prediction signal of the inter RTM method is given, for example, by equation (3) or equation (4). The authors have done some investigation on the value of the weights for the particular case of k=4. Based on that an adaptive averaging approach is proposed.

Since k=4, the predictors from the first reference list are $P_{10}, P_{20}, P_{30}, P_{40}$ and that from the second reference list are $P_{11}, P_{21}, P_{31}, P_{41}$. The predictors from each list are already sorted based on their SSD error values. The proposed method sorts, for example, all the predictors (available from both lists, i. e. the complete set of one or more predictor blocks) based on their SSD error value in ascending order and discards those that have an error value greater than a threshold (see e. g. FIG. 10), as already described above.

If, for example, the sorted predictors are $P_1, P_2, P_3, P_4, P_5, P_6, P_7, P_8$ and the weights associated with them are $w_{18}, w_{28}, w_{38}, w_{48}, w_{58}, w_{68}, w_{78}, w_{88}$ respectively, then according to eq. (3) or (4) (l=8, for 8 predictors in the set of one or more predictor blocks), $$P_{Final} = \frac{w_{18}P_1 + w_{28}P_2 + w_{38}P_3 + w_{48}P_4 + w_{58}P_5 + w_{68}P_6 + w_{78}P_7 + w_{88}P_8}{w_{18} + w_{28} + w_{38} + w_{48} + w_{58} + w_{68} + w_{78} + w_{88}} \qquad (2)$$

Let the number of sorted predictors with SSD error value less than or equal to $e_{thres}$ be 1. Then the weights are assigned, for example, with values according to the table in FIG. 12.

For example, DCT-II and DST-VII transforms or inverse-transforms are used on inter RTM residual blocks by the encoder or decoder respectively. The transform choice is, for example based on the block size irrespective of the channel type as mentioned in the table of FIG. 13a or FIG. 13b. According to an embodiment the index min can be of the value two.

According to an embodiment the region-based template matching method is added to the bitstream, for example, as an alternative merge mode, an RTM mode 400, which the encoder may choose among one or more other modes. In the subsequently explained embodiment, besides the RTM mode 400, these are a normal merge mode 300 and a normal inter-prediction mode 200. Details are described below. In the subsequently explained embodiment, an RTM merge flag 350 is transmitted after the conventional merge flag 250 to distinguish between the available inter-prediction modes. The syntax elements (or the signaling) for the proposed mode are described in FIG. 11. All the bins of inter RTM signalization are, for example, coded using Context-Adaptive Binary Arithmetic Coding (CABAC) [16].

According to an embodiment the encoder calculates the rate-distortion (RD) cost for each region and compares with that of other inter methods. The method that gives the minimum cost will, for example, be finally applied to the current block 120, by an encoder as described herein, and the information related to this mode will be sent to a decoder, as described herein, for reconstruction. The commonly used cost function J is defined as $$J=D+\lambda R, \qquad (2)$$

where D is a distortion between an original block and the predicted blocks $120'_1$ to $120'_3$, R is a number of bits associated with the method and $\lambda$ is a Lagrange parameter that determines a trade-off between D and R [1]. Alternatively a constrained rate or distortion minimization can be solved to calculate the rate-distortion (RD) cost for each region or any other known algorithm can be applied.

According to an embodiment, if the mode that has the lowest cost is inter RTM, then the index $136_1$ to $136_5$ of the corresponding region is transmitted in the bitstream/data stream to the decoder. The decoder searches for template matches optionally only in that region.

According to an embodiment the video decoder is configured to read a merge flag 250 from the data stream. If the merge flag 250 is in a first state (e. g. 0 in FIG. 11), the current block 120 is coded in a normal inter-prediction mode 200. In that case, the following information is coded for the current block 120 in the data stream: 1) a motion vector; same may be differentially coded relative to a motion vector predictor determined by encoder and decoder in the same manner; 2) optionally, a motion vector index identifying the motion vector predictor out of a list 114 of motion vector predictors $115_1$ to $115_n$; 3) optionally, a reference picture index identifying the reference picture 12" out of previously coded/decoded pictures; 4) a prediction residual such as a transform coefficient block representing the prediction residual. The list 114 might be the one which had been mentioned once above with respect to FIG. 5. The decoder decodes this information from the data stream in that mode 200 and the encoder encodes same into the data stream after having determined the in R/D sense optimal values for motion vector index, motion vector difference and quantized prediction residual, for instance. Using the motion vector signaled for the current block 120, the current block 120 is predicted. The decoder predictively decodes the current block 120 using the motion vector by motion compensated prediction, by correcting the motion compensated prediction for the current block 120 using the prediction residual coded by the encoder into the data stream.

If the merge flag is in a second state (e. g. 1 in FIG. 11), a region-based template matching merge flag (RTM merge flag 350) is coded in data stream for the current block 120 to distinguish between the normal merge mode 300 and the RTM mode 400. If the region-based template matching merge flag (RTM merge flag 350) is in a first state (e. g. 0 in FIG. 11), the normal merge mode 300 applies. In that case, the following information is conveyed in the data stream for the current block 120: a merge index 310, which selects a merge candidate out of a merge candidate list which contains motion information from previously coded inter-predicted blocks. Each motion information/merge candidate in that list already indicates 1) a motion vector using which, for example, a previously coded inter-predicted block had been coded/decoded; 2) optionally, a reference picture index identifying the reference picture 12" out of previously coded/decoded pictures, into which the motion vector points. Optionally, a prediction residual such as a transform coefficient block representing the prediction residual, is additionally contained in the data stream for the current block 120. It indicates the prediction residual using which the motion-compensated prediction may be corrected which is contained using the motion information of the indexed merge candidate.

If the region-based template matching merge flag (RTM merge flag 350) is in a second state (e. g. 1 in FIG. 11), the RTM mode 400 applies. That is, the block 120 is coded/decoded as described above.

Figure 14A:
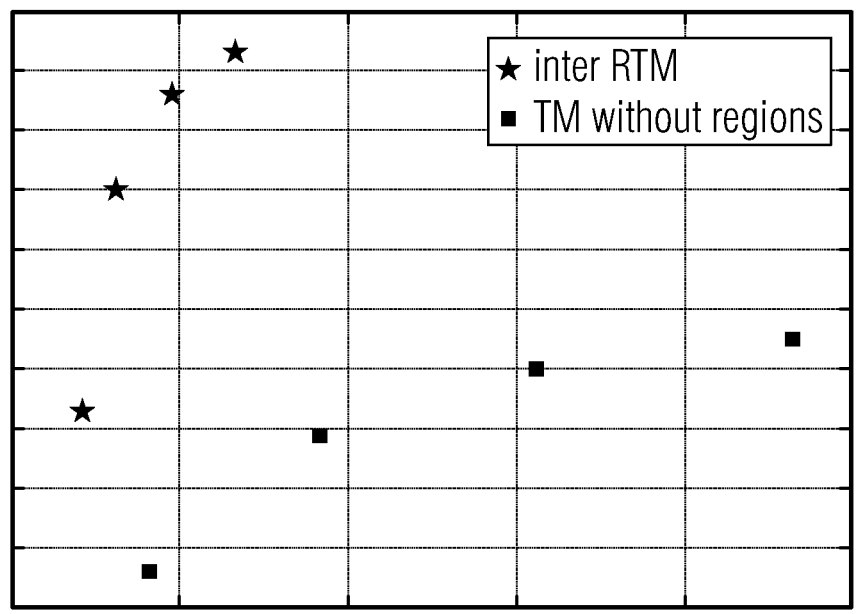
FIG. 14a shows a schematic diagram of an average bit-distortion-rate gain over a decoder complexity for inter region-based template matching, which can be performed by a video encoder and/or video decoder according to an embodiment of the present invention, and for template matching without regions.
Figure 14B:
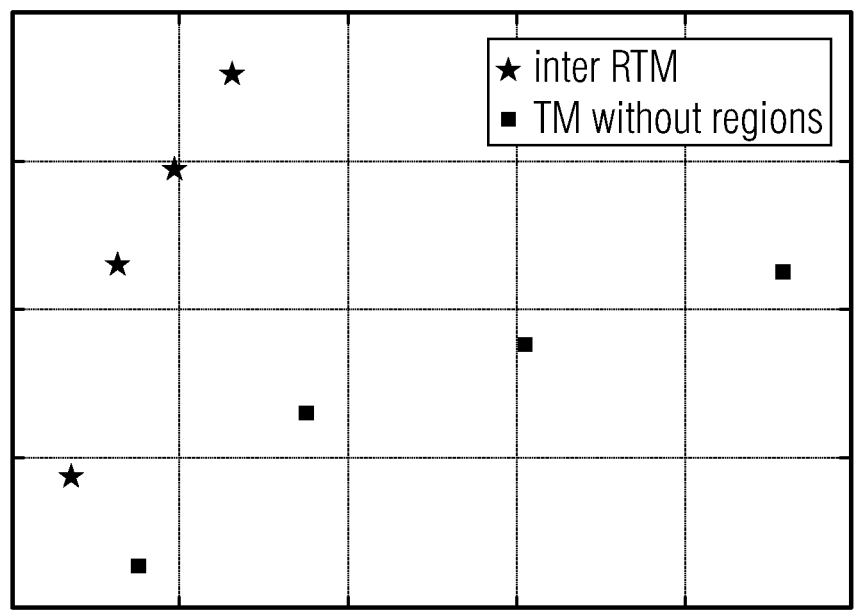
FIG. 14b shows a schematic diagram of an average bit-distortion-rate gain over a decoder run-time for inter region-based template matching, which can be performed by a video encoder and/or video decoder according to an embodiment of the present invention, and for template matching without regions.

According to an embodiment the proposed inter method can be implemented on a VVC test model (e. g. VTM version 1.0) [17], [18]. Simulations are, for example, carried out for JVET common test conditions [19] and TGM YUV 420 class of HEVC screen content coding common test conditions [20], with random access (RA) configuration (encoder_randomaccess_vtm). The experimental results for RA configurations for $A_1=A_2=A_3=4$, i. e. M=25, is tabulated in the table in FIG. 15b. It is evident from the test results that the proposed method attains, for example, more than −1.00% of average coding gain for all the classes in the test set. Therefore, it can be concluded that the inter RTM is suitable for all type of sequences. Further, the proposed method can achieve up to −9.57% BD-rate gain, for Console sequence. The average BD-rate gain for the test set is, for example, −3.15% with 132% and 201% computational complexity for decoder and encoder respectively. The comparative study of inter RTM and TM without regions, in terms of BD-rate gain and decoder complexity for M=13, 25, 37, 49 respectively, is shown in FIG. 14b. It is clear from the plot that all the inter RTM points are, for example, present to the top-left of the corresponding points of TM without regions, indicating that inter RTM can achieve a better trade-off than typical TM prediction method in terms of coding efficiency and decoder run-time.

According to an embodiment the diagram of FIG. 14b shows the average BD-rate gain in percent over/versus the decoder run-time in percent, wherein the average BD-rate gain is shown in a range of two percent to four percent in half percent steps and the decoder run-time is shown in a range of 100 percent to 350 percent in 50 percent steps.

According to an embodiment the diagram of FIG. 14b shows the average BD-rate gain in percent over/versus the decoder complexity in percent, wherein the average BD-rate gain is shown in a range of 2.3 percent to 3.3 percent in 0.1 percent steps and the decoder complexity is shown in a range of 100 percent to 350 percent in 50 percent steps.

According to an embodiment the decoder run-time can also be seen in terms of decoder complexity. Thus the decoder run-time can by synonymous to the decoder complexity.

According to an embodiment the proposed inter prediction method is implemented on NextSoftware, which is an alternative to JEM [21]. Simulations are carried out for JVET common test conditions, explained in [22], with random access (RA) configuration (encoder_randomaccess_qtbt10). The Quadtree plus Binary Tree (QTBT) tool is, for example, turned on for the tests. The QTBT is a block structuring tool which offers square and rectangle shaped blocks for coding [11]. The experimental results for RA configurations for $A_1=A_2=A_3=4$, i. e. M=25, is tabulated in the table in FIG. 15a. It is evident from the test results that, for example, the proposed method attains more than −1.50% of average coding gain for all the classes in the test set. Therefore, it can be concluded that the inter RTM is suitable for all type of sequences. Further, the proposed method can achieve up to −8.26% BD-rate gain, for Rollercoaster(offset) sequence. The average BD-rate gain for the test set is −3.00% with 184% and 131% computational complexity for encoder and decoder respectively. The comparative study of inter RTM and TM without regions, in terms of BD-rate gain and decoder complexity for M=13, 25, 37, 49 respectively, is shown in FIG. 14a. It is, for example, clear from the plot that all the inter RTM points are present to the top-left of the corresponding points of TM without regions, indicating they are faster and better. Therefore, inter RTM can achieve better trade-off than typical TM prediction methods in terms of coding efficiency and decoder run-time.

The herein described invention proposes, for example, a decoder-side motion vector derivation method using region-based template matching. The proposed algorithm partitions, for example, the search area 130 into five regions unlike conventional template matching methods. The regions are, for example, clearly defined such that they can give independent prediction signal. Given a region at the decoder, the template matching search algorithm is, for example, carried out only in that region. A linear combination of the blocks (i. e. the set of one or more predictor blocks) found from template matching is, for example, the final prediction signal. For a specific set of region sizes $132_1$ to $132_5$, the inter region-based template matching method achieves, for example, up to −8.26% or up to −9.57% BD-rate gain with an overall gain (e. g. a Bjøntegaard Delta bit rate gain) of −3.00% or −3.15% respectively for random access configuration. According to an embodiment the inter region-based template matching method achieves, for example, a BD-rate gain up to 5% to 12%, 6% to 11% or 7% to 10% with an overall gain of 1% to 6%, 2% to 5% or 3% to 4% for random access configuration. The decoder and encoder run-time are, for example, 131% or 132% and 184% or 201% respectively. According to an embodiment the decoder run-time is, for example, in a range of 100% to 160%, 120% to 150% or 125% to 135% and the encoder run-time is, for example, in a range of 160% to 220%, 170% to 210% or 180% to 205%. The experimental results indicate that the proposed method can achieve better trade-off between coding efficiency and decoding time than conventional template matching based decoder-side motion vector derivation methods. Sub-sample refinement for inter RTM will be considered as a subject of further study. The proposed method can be tuned to different combinations of coding gain and run-time by varying the size of the regions. In other words the region sizes can be varied such that different trade-offs between coding gain and complexity can be obtained.

According to an embodiment the herein described invention can be described by the following index terms:

Video coding, H.265/HEVC, JVET, JEM, VVC, VTM, Inter prediction, Motion compensation, Template matching, Decoder-side motion vector derivation.

The concept of inter RTM prediction is mainly explained for the case of n=5 herein. However, the idea holds for any value of n such that n is greater than 0.

The search algorithms (for deciding C and for the best template matches) in the given example are carried out at integer-pel positions. Nevertheless, it can be applied to sub-pel positions.

The template 110 in the given example has a width of 2 samples. However, this can be any value greater than 0. Besides the template 110 can be broadly defined as the patch present in the immediate neighborhood of the current block 120, even though in the given example the samples present above and left of the block to be predicted are considered.

The experimental results indicates that the regions of inter RTM can be down-sampled individually or all together for decreasing the computational complexity with some reduction in coding performance.

The inter RTM method applies averaging to its k number of predictors where k≥1. However, for the special case of screen content sequences k=1 is found to be the best option (i. e. no averaging).

Further, it is found from the experimental results that varying the value of k based on the SSD error associated with $P_1$ gives better coding performance.

The normal inter prediction techniques like sub-pel refinement, sub-block refinement, filtering etc. can be applied as a post-processing stage of inter RTM mode.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive encoded video signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] V. Sze, M. Budagavi, and G. J. Sullivan, High Efficiency Video Coding (HEVC) *Algorithms and Architectures*. Springer, 2014.

[2] T. Wiegand, G. J. Sullivan, G. Bjntegaard, and A. Luthra, "Overview of the H.264/AVC video coding standard," in *IEEE Transactions on Circuits and Systems for Video Technology*, vol. 13, July 2003.

[3] G. J. Sullivan, J.-R. Ohm, W.-J. Han, and T. Wiegand, "Overview of the high efficiency video coding HEVC standard," in *IEEE Transactions on Circuits and Systems for Video Technolog*, vol. 22, September 2012, pp. 1649-1668.

[4] K. Sugimoto, M. Kobayashi, Y. Suzuki, S. Kato, and C. S. Boon, "Inter frame coding with template matching spatio-temporal prediction," in *IEEE International Conference on Image Processing (ICIP)*, Singapore, Singapore, October 2004.

[5] Y. Suzuki, C. S. Boon, and T. K. Tan, "Inter frame coding with template matching averaging," in *IEEE International Conference on Image Processing (ICIP)*, San Antonio, Tex., USA, October 2007.

[6] R. Wang, L. Huo, S. Ma, and W. Gao, "Combining template matching and block motion compensation for video coding," in *International Symposium on Intelligent Signal Processing and Communication Systems (ISPACS 2010)*.

[7] S. Kamp, M. Evertz, and M. Wien, "Decoder side motion vector derivation for inter frame video coding," in *IEEE International Conference on Image Processing (ICIP)*, San Diego, Calif., USA, October 2008.

[8] S. Kamp and M. Wien, "Decoder-side motion vector derivation for hybrid video inter coding," in *IEEE International Conference on Multimedia and Expo (ICME)*, Suntec City, Singapore, July 2010.

[9] ———, "Decoder-side motion vector derivation for block-based video cod-ing," *IEEE Transactions on Circuits and Systems for Video Technology*, vol. 22, pp. 1732-1745, December 2012.

[10] S. Kamp, B. Bross, and M. Wien, "Fast decoder side motion vector derivation for inter frame video coding," in *Picture Coding Symposium (PCS)*, Chicago, Ill., USA, May 2009.

[11] J. Chen, E. Alshina, G. J. Sullivan, J.-R. Ohm, and J. Boyce, "Algorithm description of joint exploration test model 7 (JEM 7)," in JVET-G1001, Turin, IT, July 2017.

[12] S. Esenlik, Y.-W. Chen, X. Xiu, A. Robert, X. Chen, T.-D. Chuang, B. Choi, J. Kang, and N. Park, "CE9: Summary report on decoder side my derivation," in JVET-K0029, Ljubljana, SI, July 2018.

[13] L.-Y. Wei and M. Levoy, "Fast texture synthesis using tree-structured vector quantization," vol. 34, May 2000.

[14] G. Venugopal, P. Merkle, D. Marpe, and T. Wiegand, "Fast template matching for intra prediction," in *IEEE International Conference on Image Processing (ICIP)*, Beijing, China, 2017, pp. 1692-1696.

[15] T. K. Tan, C. S. Boon, and Y. Suzuki, "Intra prediction by averaged template matching predictors," in *Proc. CCNC 2007*, Las Vegas, Nev., USA, 2007, pp. 405-109.

[16] D. Marpe, H. Schwarz, and T. Wiegand, "Context-based adaptive binary arithmetic coding in the H.264/AVC video compression standard," in *IEEE Transactions on Circuits and Systems for Video Technology*, vol. 13, July 2003, pp. 620-636.

[17] B. Bross, "Versatile video coding (draft 1)," in JVET-J1001, San Diego, US, April 2018.

[18] J. Chen and E. Alshina, "Algorithm description for versatile video coding and test model 1 (VTM 1)," in JVET-J1002, San Diego, US, April 2018.

[19] F. Bossen, J. Boyce, K. Suehring, X. Li, and V. Seregin, "JVET common test conditions and software reference configurations," in JVET-K1010, Ljubljana, SI, July 2018.

[20] H. Yu, R. Cohen, K. Rapaka, and J. Xu, "Common test conditions for screen content coding," in JCTVC-U1015, Warsaw, PL, June 2015.

[21] M. Albrecht, C. Bartnik, S. Bosse, J. Brandenburg, B. Bross, J. Erfurt, V. George, P. Haase, P. Helle, C. Helmrich, A. Henkel, T. Hinz, S. de Luxan Hernandez, S. Kaltenstadler, H. Kirchhoffer, C. Lehmann, W.-Q. Lim, J. Ma, D. Maniry, D. Marpe, P. Merkle, T. Nguyen, J. Pfaff, J. Rasch, R. Rischke, C. Rudat, M. Schaefer, T. Schierl, H. Schwarz, M. Siekmann, R. Skupin, B. Stallenberger, J. Stegemann, K. Suehring, G. Tech, G. Venugopal, S. Walter, A. Wieckowski, T. Wiegand, and M. Winken, "Description of SDR, HDR, and 360 video coding technology proposal by Fraunhofer HHI," in JVET-J0014-v1, San Diego, US, April 2018.

[22] A. Segall, V. Baroncini, J. Boyce, J. Chen, and T. Suzuki, "Joint call for proposals on video compression with capability beyond HEVC," in JVET-H1002 (v6), Macau, China, October 2017.

The invention claimed is:

1. A video decoder, configured to:
   determine a set of search area location candidates in a reference picture of a video;
   match the set of search area location candidates with a current template area adjacent to a current block of a current picture to acquire a best matching search area location candidate;
   select, out of a search area positioned in the reference picture at the best matching search area location candidate or a predetermined search region within the search area, a set of one or more predictor blocks by matching the current template area against the search area or the predetermined search region within the search area; and
   predictively decode the current block from a data stream based on the set of one or more predictor blocks,
   wherein the search area is subdivided into search regions, and the video decoder is configured to
   select the predetermined search region out of the search regions based on a signalization in the data stream; and
   restrict the selection of the set of one or more predictor blocks, by matching the current template area against the search area, to the predetermined search region,
   wherein the search area is subdivided into the search regions so that a first search region is arranged in a middle of the search area and further search regions are arranged in a manner surrounding the first search region,
   wherein the signalization comprises a search region index indexing the predetermined search region out of the search regions, and
   wherein the video decoder is configured to decode the search region index from the data stream using a variable length code which assigns a first codeword of a shortest codeword length of the variable length code to the first search region.

2. The video decoder of claim 1, configured to determine the set of search area location candidates using one or more motion vector predictors spatially and/or temporally predicted for the current block.

3. The video decoder of claim 2, configured to round the one or more motion vector predictors to integer-sample positions in order to acquire the set of search area location candidates.

4. The video decoder of claim 1, configured to check whether a predicted search area location in the reference picture, colocated to the current template area of the current block, is contained in the set of search area location candidates, and if not, add the predicted search area location to the set of search area location candidates.

5. The video decoder of claim 1, configured to, in matching the set of search area location candidates with the current template area,
   for each of the set of search area location candidates, determine a similarity of the reference picture, at one or more positions, at and/or around the respective search area location candidate, to the current template area, and
   appoint a search area location candidate the best matching search area location candidate for which the similarity is highest.

6. The video decoder of claim 5, configured to determine the similarity by way of a sum of squared sample differences.

7. The video decoder of claim 6, configured to
   determine the similarity at the one or more positions by determining the sum of squared sample differences between the current template area and a coshaped candidate template area at the one or more positions in the reference picture,
   wherein the best matching search area location candidate is associated with a least sum of squared sample differences out of a set of sum of squared differences.

8. The video decoder of claim 1,
   wherein the search area is subdivided into the search regions so that each of the further search regions extends circumferentially around the first region in an incomplete manner, and
   wherein the variable length code assigns second codewords to the further search regions which are of mutually equal length.

9. The video decoder of claim 1, configured to decode the current block by determining a linear combination of the set of one or more predictor blocks.

10. The video decoder of claim 1, configured to decode the current block based on an average, including a normal average, a weighted average, or a combination of both, of the set of one or more predictor blocks, or based on an average of a subset out of the set of one or more predictor blocks with a subset excluding predictor blocks from the set of one or more predictor blocks whose reference template area matches with the current template area more than a predetermined threshold worse than that for a best matching predictor block in the set of one or more predictor blocks.

11. The video decoder of claim 1, configured to, in predictively decoding the current block from the data stream based on the set of one or more predictor blocks,
   sort and weight the set of one or more predictor blocks based on a similarity of a reference template area of each of the predictor blocks and the current template area, and
   determine the current block $P_{final}$ according to $$P_{final} = \frac{\sum_{i=1}^{n} P_i w_{il}}{\sum_{i=1}^{n} w_{il}},$$

wherein $P_i$ is a predictor block of the sorted set of one or more predictor blocks $P_1$ to $P_n$,
      wherein $w_{il}$ is a weighing factor applied to the predictor block $P_i$,
      wherein i is an index associated with a position of the predictor block $P_i$ in the sorted set of one or more predictor blocks $P_1$ to $P_n$,
      wherein n is an index associated with a total number of predictor block $P_i$ in the sorted set of one or more predictor blocks $P_1$ to $P_n$,
      wherein 1 is an index associated with the number of predictor blocks $P_i$ in the sorted set of one or more predictor blocks $P_1$ to $P_n$, whose reference template area matches with the current template area more than a predetermined threshold, and
      wherein the predetermined threshold is based on a highest similarity.

12. The video decoder of claim 1, configured to
read a merge flag from the data stream,
if the merge flag is in a first state, decode a motion vector from the data stream for the current block and predictively decode the current block using the motion vector by motion compensated prediction, and
if the merge flag is in a second state, read a region-based template matching merge flag from the data stream,
wherein if the region-based template matching merge flag is in a first state, read a merge index from the data stream, use the merge index to select a merge candidate out of a merge candidate list and predictively decode the current block using motion information associated with the selected merge candidate by motion compensated prediction, and
if the region-based template matching merge flag is in a second state, perform the determination of the set of search area location candidates, the matching of the set of search area location candidates with the current template area, the selection of the set of one or more predictor blocks and the predictively decoding of the current block from the data stream based on the set of one or more predictor blocks.

13. A method for video decoding, comprising;
determining a set of search area location candidates in a reference picture of a video;
matching the set of search area location candidates with a current template area adjacent to a current block of a current picture to acquire a best matching search area location candidate;
selecting, out of a search area positioned in the reference picture at the best matching search area location candidate or a predetermined search region within the search area, a set of one or more predictor blocks by matching the current template area against the search area or the predetermined search region within the search area; and
predictively decoding the current block from a data stream based on the set of one or more predictor blocks,
wherein the search area is subdivided into search regions, and the method comprises
selecting the predetermined search region out of the search regions based on a signalization in the data stream; and
restricting the selection of the set of one or more predictor blocks, by matching the current template area against the search area, to the predetermined search region,
wherein the search area is subdivided into the search regions so that a first search region is arranged in a middle of the search area and further search regions are arranged in a manner surrounding the first search region,
wherein the signalization comprises a search region index indexing the predetermined search region out of the search regions, and
wherein the method comprises decoding the search region index from the data stream using a variable length code which assigns a first codeword of a shortest codeword length of the variable length code to the first search region.

14. A non-transitory digital storage medium having a computer program stored thereon to perform a method for video decoding, when the computer program is run by a computer, the method comprising:
determining a set of search area location candidates in a reference picture of a video;
matching the set of search area location candidates with a current template area adjacent to a current block of a current picture to acquire a best matching search area location candidate;
selecting, out of a search area positioned in the reference picture at the best matching search area location candidate or a predetermined search region within the search area, a set of one or more predictor blocks by matching the current template area against the search area or the predetermined search region within the search area; and
predictively decoding the current block from a data stream based on the set of one or more predictor blocks,
wherein the search area is subdivided into search regions, and the method comprises
selecting the predetermined search region out of the search regions based on a signalization in the data stream; and
restricting the selection of the set of one or more predictor blocks, by matching the current template area against the search area, to the predetermined search region,
wherein the search area is subdivided into the search regions so that a first search region is arranged in a middle of the search area and further search regions are arranged in a manner surrounding the first search region,
wherein the signalization comprises a search region index indexing the predetermined search region out of the search regions, and
wherein the method comprises decoding the search region index from the data stream using a variable length code which assigns a first codeword of a shortest codeword length of the variable length code to the first search region.

15. A video encoder, configured to:
determine a set of search area location candidates in a reference picture of a video;
match the set of search area location candidates with a current template area adjacent to a current block of a current picture to acquire a best matching search area location candidate;
select, out of a search area positioned in the reference picture at the best matching search area location candidate or a predetermined search region within the search area, a set of one or more predictor blocks by matching the current template area against the search area or the predetermined search region within the search area; and
predictively encode the current block into a data stream based on the set of one or more predictor blocks,
wherein the search area is subdivided into search regions, and the video encoder is configured to
select the predetermined search region out of the search regions and signal the selected search region into the data stream; and
restrict the selection of the set of one or more predictor blocks, by matching the current template area against the search area, to the predetermined search region,
wherein the search area is subdivided into the search regions so that a first search region is arranged in a middle of the search area and further search regions are arranged in a manner surrounding the first search region,
wherein the signalization comprises a search region index indexing the predetermined search region out of the search regions, and wherein the video encoder is configured to encode the search region index into the data stream using a variable length code which assigns a first codeword of a shortest codeword length of the variable length code to the first search region.

16. The video encoder of claim 15, configured to determine the set of search area location candidates using one or more motion vector predictors spatially and/or temporally predicted for the current block.

17. The video encoder of claim 16, configured to round the one or more motion vector predictors to integer-sample positions in order to acquire the set of search area location candidates.

18. The video encoder of claim 15, configured to check whether a predicted search area location in the reference picture, colocated to the current template area of the current block, is contained in the set of search area location candidates, and if not, add the predicted search area location to the set of search area location candidates.

19. The video encoder of claim 15, configured to, in matching the set of search area location candidates with a current template area,
for each of the set of search area location candidates, determine a similarity of the reference picture, at one or more positions, at and/or around the respective search area location candidate, to the current template area, and
appoint a search area location candidate the best matching search area location candidate for which the similarity is highest.

20. The video encoder of claim 19, configured to determine the similarity by way of a sum of squared sample differences.

21. The video encoder of claim 20, configured to determine the similarity at the one or more positions by determining differences between the current template area and a coshaped candidate template area at the one or more positions in the reference picture.

22. The video encoder of claim 15,
wherein the search area is subdivided into the search regions so that each of the further search regions extends circumferentially around the first region in an incomplete manner and
wherein the variable length code assigns second codewords to the further search regions which are of mutually equal length.

23. The video encoder of claim 15, configured to encode the current block by determining a linear combination of the set of one or more predictor blocks.

24. The video encoder of claim 15, configured to encode the current block based on an average, including a normal average, a weighted average, or a combination of both, of the set of one or more predictor blocks, or based on an average of a subset out of the set of one or more predictor blocks with a subset excluding predictor blocks from the set of one or more predictor blocks whose reference template area matches with the current template area more than a predetermined threshold worse than that for a best matching predictor block in the set of one or more predictor blocks.

25. The video encoder of claim 15, configured to, in predictively encoding the current block into a data stream based on the set of one or more predictor blocks,
sort and weight the set of one or more predictor blocks based on a similarity of a reference template area of each of the predictor blocks and the current template area, and
determine the current block $P_{final}$ according to $$P_{final} = \frac{\sum_{i=1}^{n} P_i w_{il}}{\sum_{i=1}^{n} w_{il}},$$

wherein $P_i$ is a predictor block of the sorted set of one or more predictor blocks $P_1$ to $P_n$,
wherein $w_{il}$ is a weighing factor applied to the predictor block $P_i$,
wherein i is an index associated with a position of the predictor block $P_i$ in the sorted set of one or more predictor blocks $P_1$ to $P_n$,
wherein n is an index associated with a total number of predictor block $P_i$ in the sorted set of one or more predictor blocks $P_1$ to $P_n$,
wherein 1 is an index associated with the number of predictor blocks $P_i$ in the sorted set of one or more predictor blocks $P_1$ to $P_n$, whose reference template area matches with the current template area more than a predetermined threshold, and
wherein the predetermined threshold is based on the highest similarity.

26. The video encoder of claim 15, configured to
write a merge flag into the data stream
if the merge flag is in a first state, predictively encode the current block into the data stream using a motion vector by motion compensated prediction and encode the motion vector into the data stream for the current block, and
if the merge flag is in a second state, write a region-based template matching merge flag into the data stream,
wherein if the region-based template matching merge flag is in a first state, select a merge candidate out of a merge candidate list, predictively encode the current block using motion information associated with the selected merge candidate by motion compensated prediction and write a merge index into the data stream, associated with the merge candidate, and
if the region-based template matching merge flag is in a second state, perform the determination of the set of search area location candidates, the matching of the set of search area location candidates with the current template area, the selection of the set of one or more predictor blocks and the predictively encoding of the current block into the data stream based on the set of one or more predictor blocks.

27. A method for video encoding, comprising:
determining a set of search area location candidates in a reference picture of a video;
matching the set of search area location candidates with a current template area adjacent to a current block of a current picture to acquire a best matching search area location candidate;
selecting, out of a search area positioned in the reference picture at the best matching search area location candidate or a predetermined search region within the search area, a set of one or more predictor blocks by matching the current template area against the search area or the predetermined search region within the search area; and
predictively encoding the current block into a data stream based on the set of one or more predictor blocks, wherein the search area is subdivided into search regions, and the method comprises
selecting the predetermined search region out of the search regions and signal the selected search region into the data stream; and
restricting the selection of the set of one or more predictor blocks, by matching the current template area against the search area, to the predetermined search region,
wherein the search area is subdivided into the search regions so that a first search region is arranged in a middle of the search area and further search regions are arranged in a manner surrounding the first search region,
wherein the signalization comprises a search region index indexing the predetermined search region out of the search regions, and
wherein the method comprises encoding the search region index into the data stream using a variable length code which assigns a first codeword of a shortest codeword length of the variable length code to the first search region.

28. A non-transitory digital storage medium having a computer program stored thereon to perform a method for video encoding, when the computer program is run by a computer, the method comprising:
determining a set of search area location candidates in a reference picture of a video;
matching the set of search area location candidates with a current template area adjacent to a current block of a current picture to acquire a best matching search area location candidate;
selecting, out of a search area positioned in the reference picture at the best matching search area location candidate or a predetermined search region within the search area, a set of one or more predictor blocks by matching the current template area against the search area or the predetermined search region within the search area; and
predictively encoding the current block into a data stream based on the set of one or more predictor blocks,
wherein the search area is subdivided into search regions, and the method comprises
selecting the predetermined search region out of the search regions and signal the selected search region into the data stream; and
restricting the selection of the set of one or more predictor blocks, by matching the current template area against the search area, to the predetermined search region,
wherein the search area is subdivided into the search regions so that a first search region is arranged in a middle of the search area and further search regions are arranged in a manner surrounding the first search region,
wherein the signalization comprises a search region index indexing the predetermined search region out of the search regions, and
wherein the method comprises encoding the search region index into the data stream using a variable length code which assigns a first codeword of a shortest codeword length of the variable length code to the first search region.

29. A non-transitory digital storage medium storing a data stream acquired by a method for video encoding, the method comprising:
determining a set of search area location candidates in a reference picture of a video;
matching the set of search area location candidates with a current template area adjacent to a current block of a current picture to acquire a best matching search area location candidate;
selecting, out of a search area positioned in the reference picture at the best matching search area location candidate or a predetermined search region within the search area, a set of one or more predictor blocks by matching the current template area against the search area or the predetermined search region within the search area; and
predictively encoding the current block into a data stream based on the set of one or more predictor blocks,
wherein the search area is subdivided into search regions, and the method comprises
selecting the predetermined search region out of the search regions and signal the selected search region into the data stream; and
restricting the selection of the set of one or more predictor blocks, by matching the current template area against the search area, to the predetermined search region,
wherein the search area is subdivided into the search regions so that a first search region is arranged in a middle of the search area and further search regions are arranged in a manner surrounding the first search region,
wherein the signalization comprises a search region index indexing the predetermined search region out of the search regions, and
wherein the method comprises encoding the search region index into the data stream using a variable length code which assigns a first codeword of a shortest codeword length of the variable length code to the first search region.

30. A video decoder, configured to:
determine a set of search area location candidates in a reference picture of a video;
match the set of search area location candidates with a current template area adjacent to a current block of a current picture to acquire a best matching search area location candidate;
select, out of a search area positioned in the reference picture at the best matching search area location candidate or a predetermined search region within the search area, a set of one or more predictor blocks by matching the current template area against the search area or the predetermined search region within the search area; and
predictively decode the current block from a data stream based on the set of one or more predictor blocks,
wherein the video decoder is configured to, in predictively decoding the current block from the data stream based on the set of one or more predictor blocks,
sort and weight the set of one or more predictor blocks based on a similarity of a reference template area of each of the predictor blocks and the current template area, and
determine the current block $P_{final}$ according to $$P_{final} = \frac{\sum_{i=1}^{n} P_i w_{il}}{\sum_{i=1}^{n} w_{il}},$$

wherein $P_i$ is a predictor block of the sorted set of one or more predictor blocks $P_1$ to $P_n$, wherein $w_{il}$ is a weighing factor applied to the predictor block $P_i$, wherein i is an index associated with a position of the predictor block $P_i$ in the sorted set of one or more predictor blocks $P_1$ to $P_n$, wherein n is an index associated with a total number of predictor block $P_i$ in the sorted set of one or more predictor blocks $P_1$ to $P_n$, wherein 1 is an index associated with the number of predictor blocks $P_i$ in the sorted set of one or more predictor blocks $P_1$ to $P_n$, whose reference template area matches with the current template area more than a predetermined threshold, and wherein the predetermined threshold is based on the highest similarity.

31. A method for video decoding, comprising:

determining a set of search area location candidates in a reference picture of a video;

matching the set of search area location candidates with a current template area adjacent to a current block of a current picture to acquire a best matching search area location candidate;

selecting, out of a search area positioned in the reference picture at the best matching search area location candidate or a predetermined search region within the search area, a set of one or more predictor blocks by matching the current template area against the search area or the predetermined search region within the search area; and predictively decoding the current block from a data stream based on the set of one or more predictor blocks, wherein the method comprises, in predictively decoding the current block from the data stream based on the set of one or more predictor blocks, sorting and weighting the set of one or more predictor blocks based on a similarity of a reference template area of each of the predictor blocks and the current template area, and determining the current block $P_{final}$ according to $$P_{final} = \frac{\sum_{i=1}^{n} P_i w_{il}}{\sum_{i=1}^{n} w_{il}},$$

wherein $P_i$ is a predictor block of the sorted set of one or more predictor blocks $P_1$ to $P_n$, wherein $w_{il}$ is a weighing factor applied to the predictor block $P_i$, wherein i is an index associated with a position of the predictor block $P_i$ in the sorted set of one or more predictor blocks $P_1$ to $P_n$, wherein n is an index associated with a total number of predictor block $P_i$ in the sorted set of one or more predictor blocks $P_1$ to $P_n$, wherein 1 is an index associated with the number of predictor blocks $P_i$ in the sorted set of one or more predictor blocks $P_i$ to $P_n$, whose reference template area matches with the current template area more than a predetermined threshold, and wherein the predetermined threshold is based on the highest similarity.

32. A non-transitory digital storage medium having a computer program stored thereon to perform the method for video decoding according to claim 31.

33. A video encoder, configured to:

determine a set of search area location candidates in a reference picture of a video;

match the set of search area location candidates with a current template area adjacent to a current block of a current picture to acquire a best matching search area location candidate;

select, out of a search area positioned in the reference picture at the best matching search area location candidate or a predetermined search region within the search area, a set of one or more predictor blocks by matching the current template area against the search area or the predetermined search region within the search area; and predictively encode the current block into a data stream based on the set of one or more predictor blocks, wherein the video encoder is configured to, in predictively encoding the current block into a data stream based on the set of one or more predictor blocks, sort and weight the set of one or more predictor blocks based on a similarity of a reference template area of each of the predictor blocks and the current template area, and determine the current block $P_{final}$ according to $$P_{final} = \frac{\sum_{i=1}^{n} P_i w_{il}}{\sum_{i=1}^{n} w_{il}},$$

wherein $P_i$ is a predictor block of the sorted set of one or more predictor blocks $P_1$ to $P_n$, wherein $w_{il}$ is a weighing factor applied to the predictor block $P_i$, wherein i is an index associated with a position of the predictor block $P_i$ in the sorted set of one or more predictor blocks $P_1$ to $P_n$, wherein n is an index associated with a total number of predictor block $P_i$ in the sorted set of one or more predictor blocks $P_1$ to $P_n$, wherein 1 is an index associated with the number of predictor blocks $P_i$ in the sorted set of one or more predictor blocks $P_i$ to $P_n$, whose reference template area matches with the current template area more than a predetermined threshold, and wherein the predetermined threshold is based on the highest similarity.

34. A method for video encoding, comprising:

determining a set of search area location candidates in a reference picture of a video;

matching the set of search area location candidates with a current template area adjacent to a current block of a current picture to acquire a best matching search area location candidate;

selecting, out of a search area positioned in the reference picture at the best matching search area location candidate or a predetermined search region within the search area, a set of one or more predictor blocks by matching the current template area against the search area or the predetermined search region within the search area; and predictively encoding the current block into a data stream based on the set of one or more predictor blocks, wherein the method comprises, in predictively encoding the current block into a data stream based on the set of one or more predictor blocks, sorting and weighting the set of one or more predictor blocks based on a similarity of a reference template area of each of the predictor blocks and the current template area, and determining the current block $P_{final}$ according to $$P_{final} = \frac{\sum_{i=1}^{n} P_i w_{il}}{\sum_{i=1}^{n} w_{il}},$$

wherein $P_i$ is a predictor block of the sorted set of one or more predictor blocks $P_1$ to $P_n$, wherein $w_{il}$ is a weighing factor applied to the predictor block $P_i$, wherein i is an index associated with a position of the predictor block $P_i$ in the sorted set of one or more predictor blocks $P_1$ to $P_n$, wherein n is an index associated with a total number of predictor block $P_i$ in the sorted set of one or more predictor blocks $P_1$ to $P_n$, wherein 1 is an index associated with the number of predictor blocks $P_i$ in the sorted set of one or more predictor blocks $P_1$ to $P_n$, whose reference template area matches with the current template area more than a predetermined threshold, and wherein the predetermined threshold is based on the highest similarity.

35. A non-transitory digital storage medium having a computer program stored thereon to perform the method for video decoding according to claim 34.

36. A non-transitory digital storage medium storing a data stream acquired by the method for video encoding according to claim 34.

* * * * *